United States Patent
Shibata et al.

(10) Patent No.: US 11,100,733 B2
(45) Date of Patent: Aug. 24, 2021

(54) VEHICLE INSPECTION DEVICE AND VEHICLE INSPECTION METHOD

(71) Applicant: HONDA MOTOR CO., LTD., Tokyo (JP)

(72) Inventors: Masatoshi Shibata, Tochigi-ken (JP); Yumeki Yui, Tochigi-ken (JP); Naoki Kobayashi, Tochigi-ken (JP)

(73) Assignee: HONDA MOTOR CO., LTD., Tokyo (JP)

(*) Notice: Subject to any disclaimer, the term of this patent is extended or adjusted under 35 U.S.C. 154(b) by 218 days.

(21) Appl. No.: 16/244,170

(22) Filed: Jan. 10, 2019

(65) Prior Publication Data

US 2019/0221057 A1    Jul. 18, 2019

(30) Foreign Application Priority Data

Jan. 15, 2018 (JP) .............................. JP2018-003930

(51) Int. Cl.
| | |
|---|---|
| H04W 4/48 | (2018.01) |
| G07C 5/02 | (2006.01) |
| G01M 17/007 | (2006.01) |
| G07C 5/08 | (2006.01) |
| H04L 29/08 | (2006.01) |
| H04L 12/40 | (2006.01) |

(52) U.S. Cl.
CPC ......... *G07C 5/0875* (2013.01); *G01M 17/007* (2013.01); *G07C 5/02* (2013.01); *H04L 12/40006* (2013.01); *H04L 67/12* (2013.01); *H04W 4/48* (2018.02); *G07C 2205/02* (2013.01)

(58) Field of Classification Search
CPC .... G07C 5/0875; G07C 5/02; G07C 2205/02; H04L 67/12; H04L 12/40006; H04L 2012/40215; H04W 4/48; G01M 17/007
See application file for complete search history.

(56) References Cited

U.S. PATENT DOCUMENTS

| | | | | |
|---|---|---|---|---|
| 5,555,498 A | * | 9/1996 | Berra .................. | G06F 11/2733 701/34.3 |
| 9,529,776 B2 | | 12/2016 | Yasuda | |
| 2005/0027404 A1 | * | 2/2005 | Ban ..................... | B60W 50/04 701/1 |

FOREIGN PATENT DOCUMENTS

| | | |
|---|---|---|
| CN | 103403771 | 11/2013 |
| JP | 2010-272971 | 12/2010 |
| JP | 2016-151471 | 8/2016 |

OTHER PUBLICATIONS

Chinese Office Action and Search Report for Chinese Patent Application No. 201910037127.3 dated Sep. 2, 2020.

* cited by examiner

*Primary Examiner* — Rami Khatib
*Assistant Examiner* — Shahira Baajour
(74) *Attorney, Agent, or Firm* — Amin, Turocy & Watson LLP

(57) ABSTRACT

A vehicle inspection device includes an inspection processing section and a communication processing section. The inspection processing section includes an inspection control section that generates a first communication request or a second communication request based on an inspection program, a communication request transmission buffer that stores the first communication request, and a transmission buffer for high-speed communication that stores the second communication request. The communication processing section transmits the first communication request to an ECU to be inspected and transmits the second communication request to an ECU on which writing is to be performed.

9 Claims, 13 Drawing Sheets

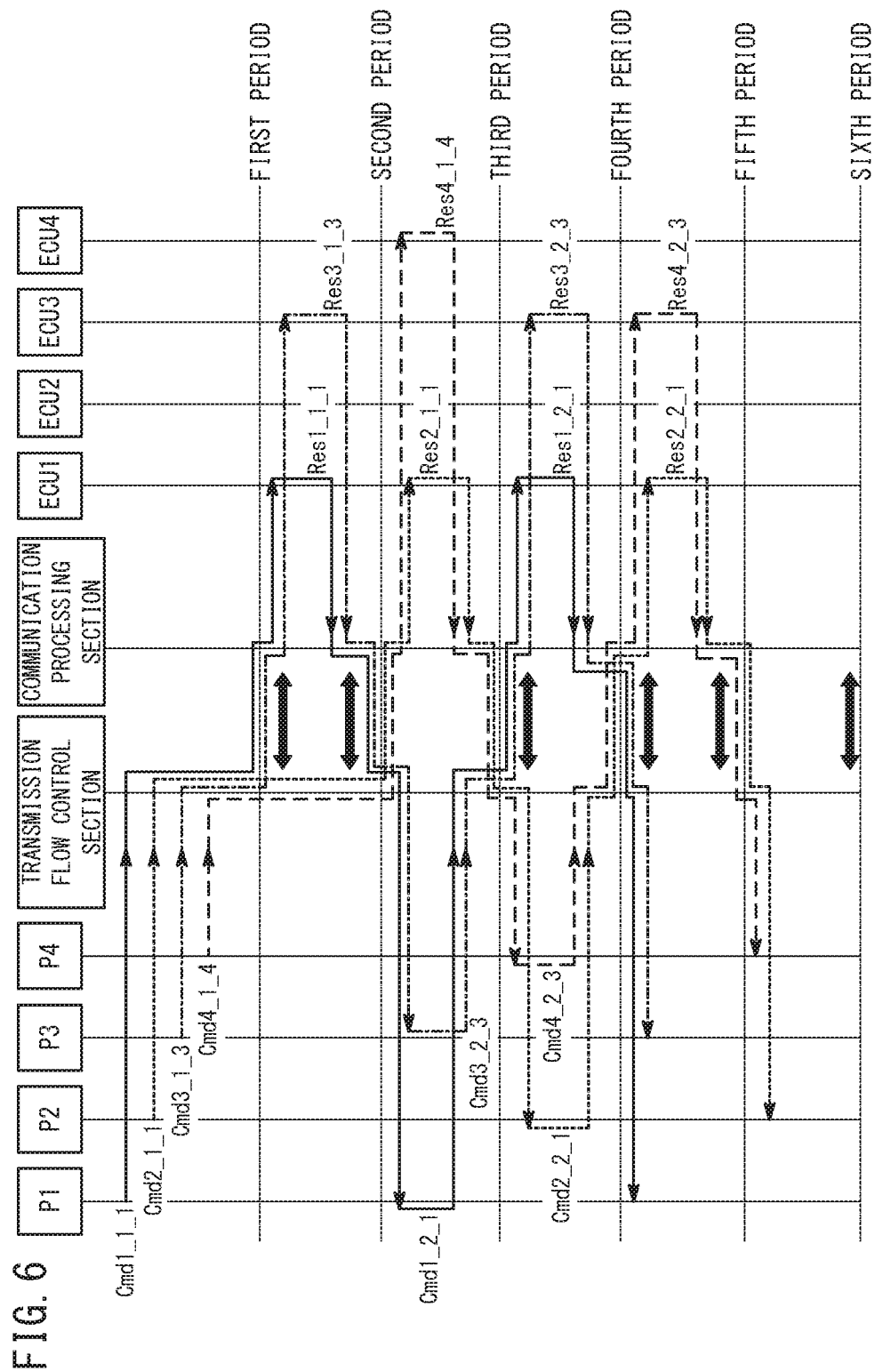

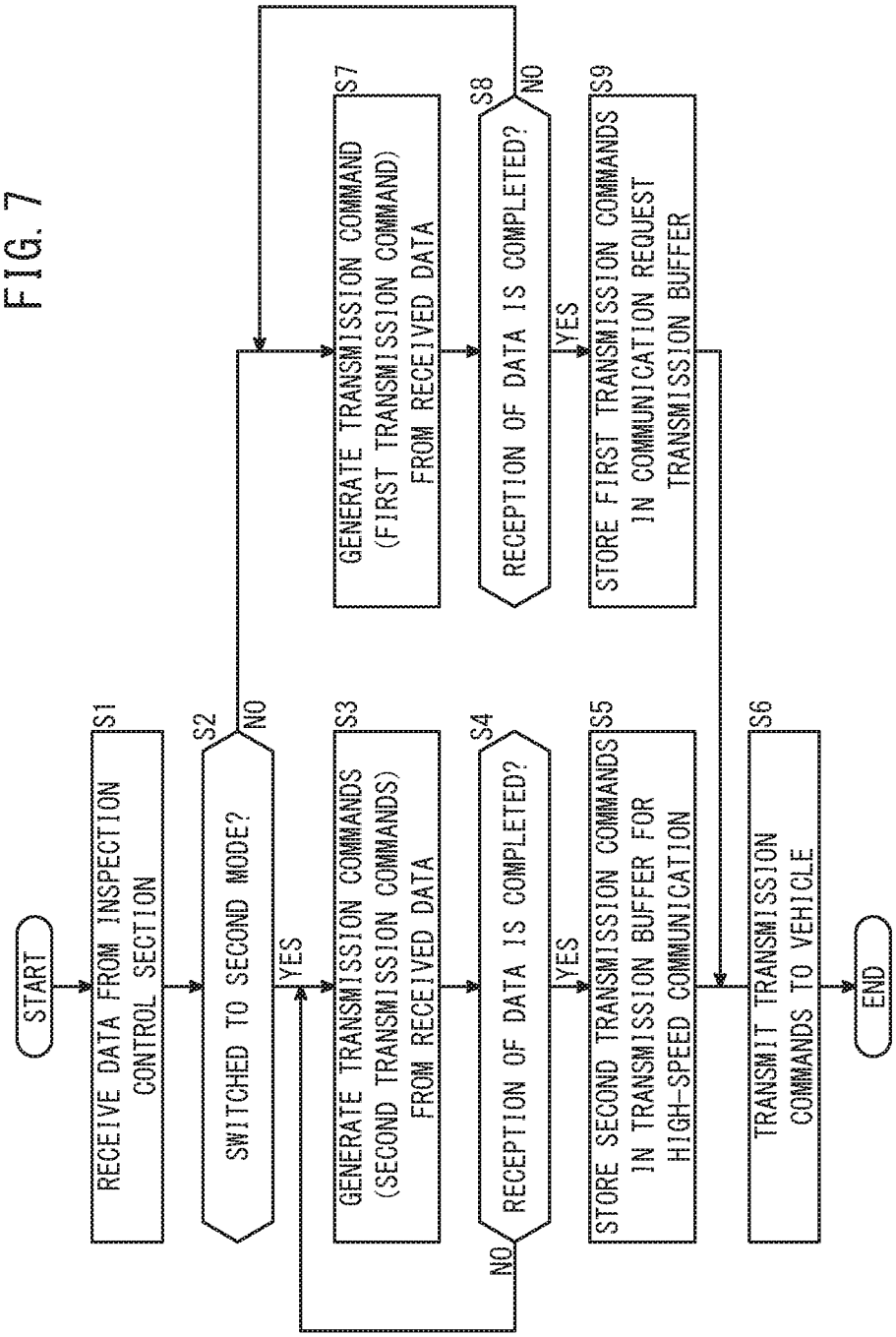

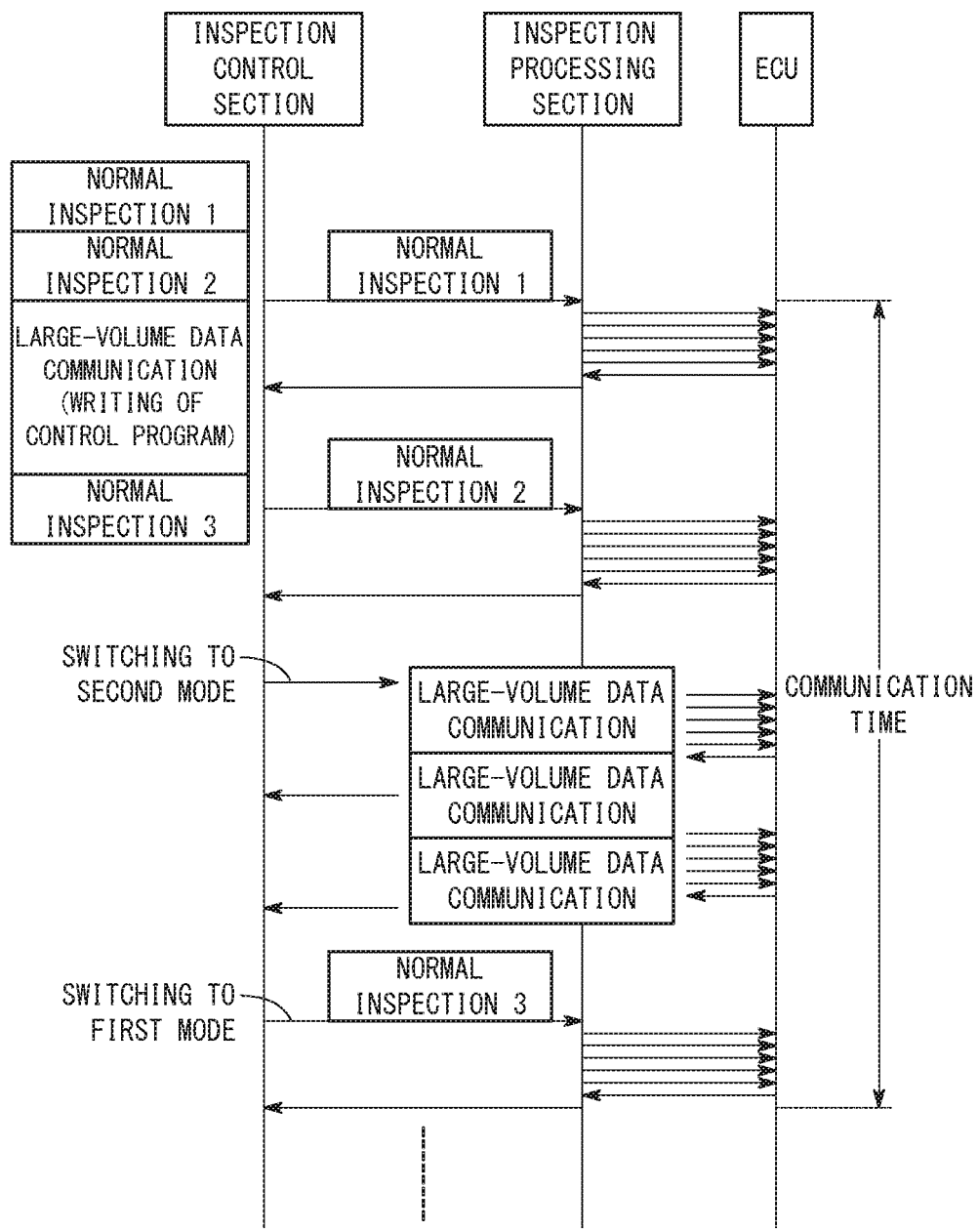

VEHICLE INSPECTION DEVICE AND VEHICLE INSPECTION METHOD

CROSS-REFERENCE TO RELATED APPLICATION

This application is based upon and claims the benefit of priority from Japanese Patent Application No. 2018-003930 filed on Jan. 15, 2018, the contents of which are incorporated herein by reference.

BACKGROUND OF THE INVENTION

Field of the Invention

The present invention relates to a vehicle inspection device and a vehicle inspection method which determine pass or fail of inspection items about a vehicle by communicating with a plurality of electronic control units inside the vehicle.

Description of the Related Art

In Japanese Laid-Open Patent Publication No. 2016-151471, a vehicle inspection device is disclosed which makes communication requests to a plurality of electronic control units inside a vehicle and receives responses to the communication requests, and thereby determines pass or fail of inspection items about the vehicle based on the details of the received responses.

In Japanese Laid-Open Patent Publication No. 2010-272971, a technique for rewriting control programs of a plurality of electronic control units inside a vehicle from an external management center or a DIAG terminal via an existing communication medium is disclosed.

SUMMARY OF THE INVENTION

As described above, in the past, inspections of a plurality of electronic control units and writing of control programs thereto have been performed by separate devices. Moreover, the vehicle inspection device of Japanese Laid-Open Patent Publication No. 2016-151471 makes it possible to communicate with the plurality of electronic control units at the same time with a high degree of communication efficiency by controlling the communication speeds to be equalized between the vehicle inspection device and the plurality of electronic control units.

However, when the above-described inspections and writing of control programs are performed by one device, a control program which is transmitted to an arbitrary electronic control unit from the device has a data size larger than that of data for inspection. As a result, in a state in which the communication speeds are equalized, the communication efficiency of a system as a whole is reduced, which makes it difficult to perform high-speed and high-efficiency communications.

Moreover, in the above-described vehicle inspection device, every time the vehicle inspection device receives a response to a communication request from the electronic control unit, the vehicle inspection device determines pass or fail of an inspection item and selects processing which will be performed next. For this reason, when writing of a control program to an arbitrary electronic control unit is performed by using the vehicle inspection device, an additional communication delay may develop between the vehicle inspection device and the electronic control unit.

Furthermore, the above-described inspection is performed in, for instance, a final inspection of a vehicle produced in a production plant and an inspection of a vehicle in a repair plant. Therefore, ideally, the inspection would be applicable to production lines and repair plants of different layouts while using the existing communication system.

The present invention has been made in view of these problems and an object thereof is to provide a vehicle inspection device and a vehicle inspection method which can perform, in a short time and efficiently, inspections of a plurality of electronic control units inside a vehicle and writing of control programs thereto while using the existing communication system.

The present invention relates to a vehicle inspection device including: an inspection processing section configured to generate communication requests to a plurality of electronic control units inside a vehicle by executing inspection programs set in accordance with an inspection item about the vehicle; and a communication processing section configured to transmit the generated communication request to an electronic control unit to be inspected and receive a response to the communication request from the electronic control unit to be inspected, wherein the inspection processing section determines pass or fail of the inspection item based on the response.

In this vehicle inspection device, the inspection processing section includes an inspection control section, a first buffer, and a second buffer. The inspection control section is configured to generate, based on the inspection program, a first communication request to the electronic control unit to be inspected or generate a second communication request having a data size larger than the data size of the first communication request and giving an instruction to perform writing of a control program to an arbitrary electronic control unit of the plurality of electronic control units. The first buffer is configured to store the generated first communication request. The second buffer is configured to store the generated second communication request. The communication processing section is configured to perform any one of transmission of the first communication request stored in the first buffer to the electronic control unit to be inspected and transmission of the second communication request stored in the second buffer to an electronic control unit on which writing is to be performed or both.

Moreover, the present invention relates to a vehicle inspection method by which an inspection processing section executes inspection programs set for an inspection item about a vehicle, and generates communication requests to a plurality of electronic control units inside the vehicle, the inspection processing section transmits, from a communication processing section, the generated communication request to an electronic control unit to be inspected, the communication processing section receives a response to the communication request from the electronic control unit to be inspected, and the inspection processing section determines pass or fail of the inspection item based on the received response.

The vehicle inspection method includes first to third steps. In the first step, by an inspection control section of the inspection processing section, a first communication request to the electronic control unit to be inspected is generated based on the inspection program or a second communication request is generated, the second communication request having a data size larger than the data size of the first communication request and giving an instruction to perform writing of a control program to an arbitrary electronic control unit of the plurality of electronic control units. In the second step, the generated first communication request is stored in a first buffer of the inspection processing section or the generated second communication request is stored in a second buffer of the inspection processing section. In the third step, any one of transmission of the first communication request stored in the first buffer from the communication processing section to the electronic control unit to be inspected and transmission of the second communication request stored in the second buffer from the communication processing section to an electronic control unit on which writing is to be performed or both are performed.

According to the present invention, it is possible to perform write processing of the control program without executing the inspection program. Moreover, in the write processing, even when a response to the second communication request is received, a determination on the response does not have to be made immediately. This makes it possible to reduce the time of the write processing.

Furthermore, when writing of the control program is performed on the arbitrary electronic control unit, in a time period in which an inspection of the electronic control unit is not performed, only the second communication requests of large data size are transmitted at once to the electronic control unit. As a result, compared to a case where the control program is written on a piecemeal basis during the inspection of the electronic control unit, it is possible to reduce the time of the write processing.

In addition, it is also possible for the communication processing section to transmit the first communication request to the electronic control unit to be inspected and perform an inspection of the electronic control unit and to transmit the second communication request to the electronic control unit on which writing is to be performed, which is different from the electronic control unit to be inspected, and perform write processing on the electronic control unit. As a result, in the case of a plurality of the electronic control units, it is possible to concurrently perform an inspection on one electronic control unit and write processing of the control program on another electronic control unit which is different from the one electronic control unit. This makes it possible to perform communications with the plurality of electronic control units efficiently.

As described above, according to the present invention, it is possible to perform inspections of the plurality of electronic control units and writing of the control programs thereto in a short time and efficiently while using the existing communication system. This makes it possible to apply the present invention suitably to production lines and repair plants of different layouts.

Here, the inspection control section performs switching between a first mode in which an inspection is performed on the electronic control unit to be inspected and a second mode in which writing of the control program is performed on the electronic control unit on which writing is to be performed. For this reason, the inspection control section generates the first communication request in the first mode and generates the second communication request in the second mode.

In this case, in addition to the inspection control section, the first buffer, and the second buffer, the inspection processing section further includes a transmission flow control section and a communication request transmitting section.

The transmission flow control section makes the first buffer store, in the first mode, the first communication request generated by the inspection control section and makes the second buffer store, in the second mode, the second communication request generated by the inspection control section. Moreover, the communication request transmitting section transmits the first communication request stored in the first buffer to the communication processing section in the first mode and transmits the second communication request stored in the second buffer to the communication processing section in the second mode.

As a result, it is possible to transmit appropriate communication requests to the plurality of electronic control units in accordance with the mode to which the previous mode was switched by the inspection control section. That is, in accordance with the mode to which the previous mode was switched, the transmission flow control section stores the communication requests generated by the inspection control section either in the first buffer or the second buffer. As a result, when the communication request of the mode which is not selected by the inspection control section is input to the transmission flow control section, the transmission flow control section can enter a standby state without accepting the input communication request.

Moreover, in the second mode, the transmission flow control section may divide the second communication request generated by the inspection control section into a plurality of pieces of packet data, each having a data size transmittable to the electronic control unit on which writing is to be performed from the communication processing section, and sequentially store the plurality of pieces of divided packet data in the second buffer. In this case, the communication request transmitting section sequentially reads the plurality of pieces of packet data stored in the second buffer in the order in which the pieces of packet data were stored and transmits the pieces of packet data to the communication processing section. Furthermore, the communication processing section transmits the plurality of pieces of packet data to the electronic control unit on which writing is to be performed in the order in which the pieces of packet data were received from the communication request transmitting section.

This makes it possible to make the second buffer store the second communication request (the plurality of pieces of packet data) with a simple configuration at low cost.

Here, the communication processing section includes a communication request receiving section, a third buffer, a fourth buffer, and a vehicle communication section. The communication request receiving section receives the first communication request or the second communication request from the communication request transmitting section. The third buffer stores the received first communication request. The fourth buffer stores the received second communication request. The vehicle communication section communicates with the plurality of electronic control units. Specifically, in the first mode, the vehicle communication section transmits the first communication request stored in the third buffer to the electronic control unit to be inspected and receives a first response to the first communication request from the electronic control unit to be inspected. Moreover, in the second mode, the vehicle communication section transmits the second communication request stored in the fourth buffer to the electronic control unit on which writing is to be performed and receives a second response to the second communication request from the electronic control unit on which writing is to be performed.

This makes it possible to perform an inspection of the electronic control unit to be inspected and writing of the control program to the electronic control unit on which writing is to be performed in a shorter time. Furthermore, it is possible to receive the first response and the second response reliably.

Moreover, the vehicle may include a plurality of communication lines, to each of the plurality of communication lines, one or more electronic control units may be connected, and each of the third buffer and the fourth buffer may include a memory area provided for each of the plurality of communication lines.

In this case, the inspection control section performs switching between the first mode and the second mode for each of the plurality of communication lines. In the first mode, the communication request receiving section stores the first communication request in a memory area of the third buffer, which corresponds to a communication line to which the electronic control unit to be inspected is connected, and, in the second mode, the communication request receiving section stores the second communication request in a memory area of the fourth buffer, which corresponds to a communication line to which the electronic control unit on which writing is to be performed is connected.

The vehicle communication section may be connected to the plurality of electronic control units via the plurality of communication lines, and, for each of the plurality of communication lines, in the first mode, the vehicle communication section may transmit the first communication request stored in the third buffer to the electronic control unit to be inspected and receive the first response from the electronic control unit to be inspected, and, in the second mode, the vehicle communication section may transmit the second communication request stored in the fourth buffer to the electronic control unit on which writing is to be performed and receive the second response from the electronic control unit on which writing is to be performed.

This makes it possible to perform, for each of the plurality of communication lines, an inspection of the electronic control unit and writing of the control program thereto in a short time and efficiently. As a result, for example, it is also possible to concurrently perform an inspection of the electronic control unit (the electronic control unit to be inspected) connected to one communication line and write processing on the electronic control unit (the electronic control unit on which writing is to be performed) connected to another communication line.

When each of the first to fourth buffers is a first in first out (FIFO) buffer from which the first communication request or the second communication request is output in the order in which the first communication request or the second communication request was written, it is possible to perform inspections of the plurality of electronic control units and writing of the control programs thereto at high speed and efficiently.

Furthermore, the first communication request includes a first address for identifying the electronic control unit to be inspected and a first command issued to the electronic control unit to be inspected. The second communication request includes a second address for identifying the electronic control unit on which writing is to be performed and a second command issued to the electronic control unit on which writing is to be performed.

In this case, each of the first buffer and the second buffer includes a memory area provided for each of the plurality of electronic control units. In the first mode, the transmission flow control section stores the first communication request in a memory area of the first buffer, which corresponds to the first address, and, in the second mode, the transmission flow control section stores the second communication request in a memory area of the second buffer, which corresponds to the second address.

This makes it possible to perform inspections of the plurality of electronic control units and writing of the control programs thereto accurately in a short time. As a result, for instance, it is possible to efficiently perform an inspection of one electronic control unit or writing of the control program to the same electronic control unit. Alternatively, it is also possible to efficiently perform inspections of the plurality of electronic control units and writing of the control program to an arbitrary electronic control unit in a time period different from the time periods in which the inspections are performed.

Moreover, at least one of the inspection processing section and the communication processing section may include a fifth buffer that stores a first response to the first communication request from the electronic control unit to be inspected and a second response to the second communication request from the electronic control unit on which writing is to be performed. In this case, in the first mode, every time the communication processing section receives the first response from the electronic control unit to be inspected and stores the received first response in the fifth buffer, the inspection control section determines pass or fail of the inspection item based on the stored first response, and, in the second mode, the inspection control section reads the second response stored in the fifth buffer at irregular intervals and checks the read second response.

As a result, in the first mode, transmission of the first communication request and reception of the first response are performed. Thus, it is possible to perform inspections of the plurality of electronic control units reliably. Meanwhile, in the second mode, it is possible to check the second response without causing a delay in communications between the vehicle inspection device and the plurality of electronic control units.

Furthermore, when the communication processing section performs any one of reception of a first response to the first communication request from the electronic control unit to be inspected and reception of a second response to the second communication request from the electronic control unit on which writing is to be performed or both, the first response may have a data size larger than the data size of the first communication request and the second response may have a data size smaller than the data size of the second communication request. This makes it possible to perform inspections of the plurality of electronic control units and writing of the control programs thereto in a shorter time and more efficiently.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 6 is a sequence diagram of a first mode;

FIG. 7 is a flowchart showing a switching operation between the first mode and a second mode;

FIG. 13 is a sequence diagram showing a case where the vehicle inspection device of FIG. 1 is operated by performing switching between the first mode and the second mode.

DESCRIPTION OF THE PREFERRED EMBODIMENTS

Hereinafter, a preferred embodiment of a vehicle inspection device and a vehicle inspection method according to the present invention will be described with reference to the accompanying drawings.

1. Schematic Configurations of a Vehicle Inspection Device 10 and a Vehicle 12

Figure 1:
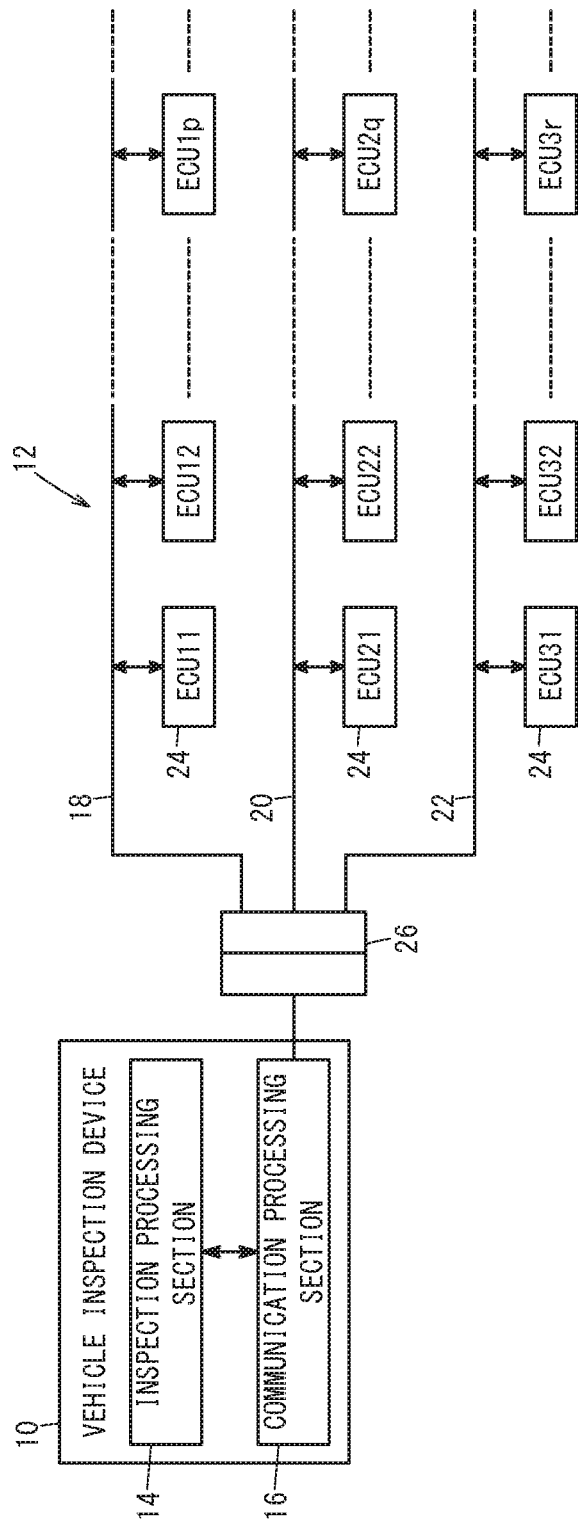
FIG. 1 is a schematic block diagram of a vehicle inspection device according to an embodiment and a vehicle.

FIG. 1 is a schematic block diagram showing the connection relationship between a vehicle inspection device 10 according to the present embodiment and a vehicle 12. The vehicle inspection device 10 includes an inspection processing section 14 and a communication processing section 16. Meanwhile, the vehicle 12 includes first to third communication lines 18, 20, and 22 based on predetermined communication standards (for example, controller area network (CAN) and K-Line) and a plurality of electronic control units (ECUs) 24 which are connected to the first to third communication lines 18, 20, and 22. The first to third communication lines 18, 20, and 22 are connected to a connector 26 of a test port, such as a datalink connector. FIG. 1 illustrates a case where there are p ECUs 24 (ECU11 to ECU1p) connected to the first communication line 18, q ECUs 24 (ECU21 to ECU2q) connected to the second communication line 20, and r ECUs 24 (ECU31 to ECU3r) connected to the third communication line 22, where p, q, and r are integers representing the respective number of ECUs.

Each of the plurality of ECUs 24 controls a corresponding one of unillustrated vehicle parts, such as an engine, an exhaust emission purifier, and a sensor, which are installed in the vehicle 12. In FIG. 1, the first communication line 18 and the second communication line 20 are CAN communication lines, and the third communication line 22 is a K-Line communication line. In each of the first to third communication lines 18, 20, and 22, the plurality of ECUs 24 can communicate with each other via the communication line to which the ECUs 24 are connected. In the present embodiment, there is at least one communication line.

The inspection processing section 14 of the vehicle inspection device 10 executes inspection programs P1 to Pm (see FIG. 2) which are previously set in accordance with inspection items about the vehicle 12 and performs various kinds of processing such as determination of pass or fail of the inspection item. The communication processing section 16 transmits and receives data to and from the plurality of ECUs 24 via the connector 26 and the first to third communication lines 18, 20, and 22 with the execution of the inspection programs P1 to Pm by the inspection processing section 14. Furthermore, the inspection processing section 14 writes (rewrites) a control program of an arbitrary ECU 24 of the plurality of ECUs 24 via the communication processing section 16, the connector 26, and the first to third communication lines 18, 20, and 22. The control program is an operation program which is used by the ECU 24 to control the vehicle part to be controlled.

In the following description, a case where an inspection is performed on an ECU 24 to be inspected is referred to as a first mode, and a case where writing of the control program is performed on an ECU 24 on which writing is to be performed is referred to as a second mode. In the present embodiment, as will be described later, it is possible to perform an inspection of one ECU 24 and writing of the control program to the same ECU 24 in different time periods by switching the mode to the first mode or the second mode. Moreover, in the present embodiment, by switching the mode to the first mode or the second mode for each of the plurality of ECUs 24, it is also possible to perform an inspection of one ECU 24 or writing of the control program to the same ECU 24 or inspections of the plurality of ECUs 24 and writing of the control program to an arbitrary ECU 24 in a time period different from the time periods in which the inspections are performed.

Furthermore, in the present embodiment, by switching the mode to the first mode or the second mode for each of the first to third communication lines 18, 20, and 22, it is also possible to perform concurrently an inspection of the ECU 24 connected to one communication line and writing of the control program to the ECU 24 connected to another communication line.

2. Configurations of the Inspection Processing Section 14 and the Communication Processing Section 16

Next, the detailed configurations of the inspection processing section 14 and the communication processing section 16 which form the vehicle inspection device 10 according to the present embodiment will be described with reference to FIGS. 2 to 5B.

Figure 2:
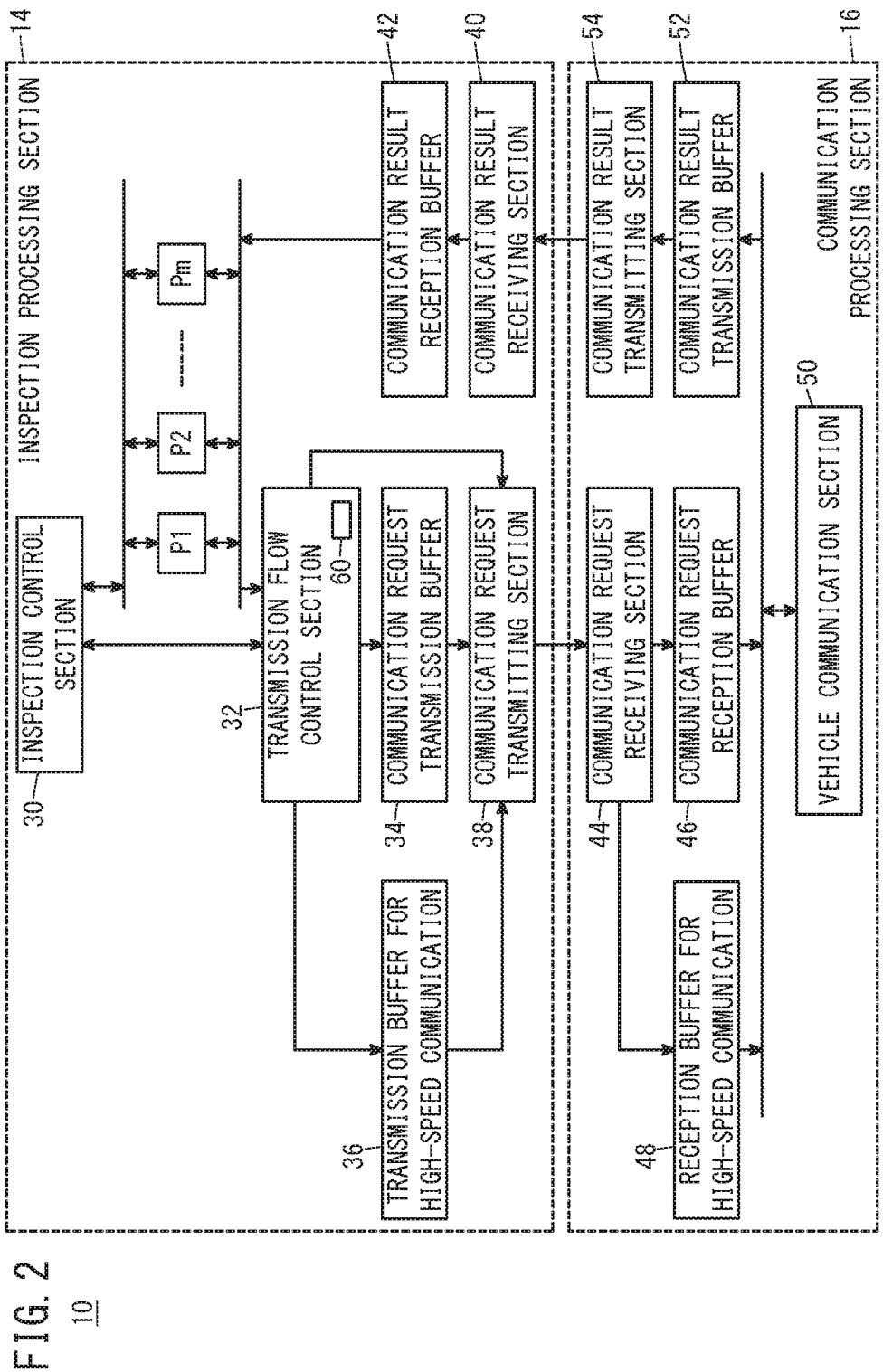
FIG. 2 is a block diagram of an inspection processing section and a communication processing section which form the vehicle inspection device of FIG. 1.

As depicted in FIG. 2, the inspection processing section 14 includes an inspection control section 30, a transmission flow control section 32, a communication request transmission buffer (a first buffer) 34, a transmission buffer for high-speed communication (a second buffer) 36, a communication request transmitting section 38, a communication result receiving section 40, and a communication result reception buffer (a fifth buffer) 42. Meanwhile, the communication processing section 16 includes a communication request receiving section 44, a communication request reception buffer (a third buffer) 46, a reception buffer for high-speed communication (a fourth buffer) 48, a vehicle communication section 50, a communication result transmission buffer (a fifth buffer) 52, and a communication result transmitting section 54.

As will be described later, since the vehicle inspection device 10 operates with switching between the first mode and the second mode being performed, in the descriptions of the inspection processing section 14 and the communication processing section 16, after the configuration in the first mode is described, the configuration in the second mode is described. Switching between the first mode and the second mode is performed by the inspection control section 30 and the transmission flow control section 32.

2.1 Configuration in the First Mode

First, the configuration of the vehicle inspection device 10 in the first mode will be described. It is to be noted that the configuration of the vehicle inspection device 10 in the first mode is substantially the same as the configuration of the vehicle inspection device of Japanese Laid-Open Patent Publication No. 2016-151471.

The inspection control section 30 of the inspection processing section 14 selects, from a plurality of previously set inspection programs, m (m: an integer greater than or equal to 1) inspection programs P1 to Pm in accordance with the model of the vehicle 12 to be inspected, and executes the selected inspection programs P1 to Pm in a predetermined order. The order in which the selected m inspection programs P1 to Pm are executed is determined in advance in accordance with the details of an inspection or determined by the user of the vehicle inspection device 10 (for example, the operator of the production plant for the vehicle 12 of FIG. 1). In the following description, it is assumed that the m inspection programs P1 to Pm are sequentially executed from the inspection program of the lowest number.

Each of the plurality of inspection programs P1 to Pm is determined in accordance with an inspection item about a particular ECU 24 of the vehicle 12 or a particular vehicle part which is controlled by a particular ECU 24. Here, the inspection item is, for instance, an item for evaluating whether or not the above-described particular ECU 24 or vehicle part is functioning normally. Moreover, in the plurality of inspection programs P1 to Pm, procedures by which pass or fail of the inspection items is determined are also provided. More specifically, in each of the plurality of inspection programs P1 to Pm, a procedure by which a communication request (a first communication request) in accordance with an inspection item is generated and a procedure by which pass or fail of the inspection item is determined by using a first response indicating the details of a reply from the vehicle 12 to the generated first communication request are provided. The first response has a data size larger than that of the first communication request.

The inspection control section 30 determines pass or fail of m inspection items by executing these inspection programs P1 to Pm. In this case, the inspection control section 30 executes the predetermined inspection programs P1 to Pm and generates the first communication request in accordance with each inspection item. The first communication request is, for example, a transmission command (a first transmission command) including a first address for identifying the ECU 24 which is a transmission destination (an object to be inspected) and a first command in which an instruction to the ECU 24 is described. The generated first communication request is transmitted to the ECU 24 which is identified by the first address. The ECU 24 that has received the first communication request executes predetermined processing in accordance with the first command and transmits the execution result to the vehicle inspection device 10 as the first response.

This makes it possible for the inspection control section 30 to receive the first response transmitted from the ECU 24 and determine pass or fail of the inspection item based on the received first response. Thus, by executing one of the inspection programs P1 to Pm, processing from generation of the first communication request to determination of pass or fail of the inspection item based on the first response is performed. The inspection control section 30 can execute multiple inspection programs of such inspection programs P1 to Pm concurrently.

Each of the numbers of first communication requests and first responses, which are transmitted and received between the vehicle inspection device 10 and the vehicle 12 as a result of one of the inspection programs P1 to Pm being executed, is not limited to one; the number thereof may be two or more. That is, in one of the inspection programs P1 to Pm, by repeating, more than once, transmission of the first communication request from the vehicle inspection device 10 to the vehicle 12 and transmission of the first response from the vehicle 12 to the vehicle inspection device 10, pass or fail of one inspection item may be determined.

The transmission flow control section 32 acquires a plurality of first communication requests, which are generated by the inspection control section 30, in the order in which the first communication requests were generated, and temporarily stores the acquired first communication requests sequentially in the communication request transmission buffer 34. The communication request transmission buffer 34 is a FIFO buffer that outputs the sequentially written first communication requests in the order in which the first communication requests were written. The communication request transmitting section 38 sequentially reads the first communication requests temporarily stored in the communication request transmission buffer 34 and transmits the read first communication requests to the communication processing section 16.

The communication result receiving section 40 receives the first response, which is transmitted from the communication processing section 16, and temporarily stores the received first response in the communication result reception buffer 42. When a plurality of first communication requests are sequentially transmitted to the vehicle 12 from the communication processing section 16, the communication result receiving section 40 writes a plurality of first responses to the communication result reception buffer 42 in the order in which the first responses were received. The communication result reception buffer 42 is a FIFO buffer that outputs the sequentially written first responses to the inspection control section 30 in the order in which the first responses were written.

Meanwhile, the communication request receiving section 44 of the communication processing section 16 receives the first communication requests transmitted from the communication request transmitting section 38 of the inspection processing section 14 and temporarily stores the received first communication requests sequentially in the communication request reception buffer 46. When a plurality of first communication requests are sequentially transmitted to the vehicle 12, the communication request receiving section 44 writes the plurality of first communication requests to the communication request reception buffer 46 in the order in which the first communication requests were received. As in the case of the communication request transmission buffer 34, the communication request reception buffer 46 is a FIFO buffer that outputs the sequentially written first communication requests to the vehicle communication section 50 in the order in which the first communication requests were written.

The vehicle communication section 50 sequentially reads the plurality of first communication requests temporarily stored in the communication request reception buffer 46 and sequentially transmits the read first communication requests to the ECUs 24, which are transmission destinations, indicated by the first addresses via the connector 26 and the first to third communication lines 18, 20, and 22. Moreover, the vehicle communication section 50 temporarily stores, sequentially in the communication result transmission buffer 52, the first responses sequentially received from the ECUs 24 via the first to third communication lines 18, 20, and 22 and the connector 26. As in the case of the communication result reception buffer 42, the communication result transmission buffer 52 is a FIFO buffer that outputs the sequentially written first responses to the communication result transmitting section 54 in the order in which the first responses were written. The communication result transmitting section 54 sequentially reads the first responses temporarily stored in the communication result transmission buffer 52 and transmits the read first responses to the communication result receiving section 40.

It is desirable that communications between the inspection processing section 14 and the communication processing section 16 are communications that conform to, for example, serial communication standards such as universal serial bus (USB). In this case, the communication request transmission buffer 34, the communication result reception buffer 42, the communication request reception buffer 46, and the communication result transmission buffer 52 are configured as cache memory based on the serial communication standards.

2.2 Configuration in the Second Mode

Next, the configuration of the vehicle inspection device 10 in the second mode will be described. In this case, since the vehicle inspection device 10 operates in the second mode, the vehicle inspection device 10 includes the transmission buffer for high-speed communication 36 and the reception buffer for high-speed communication 48 which are queues. Moreover, the transmission flow control section 32 includes a mode determination table 60 for determining the presence or absence of switching between the first mode and the second mode. Furthermore, each section in the vehicle inspection device 10 is configured as described below because the section operates in the second mode.

When writing of the control program to an arbitrary ECU 24 of the plurality of ECUs 24 is needed in the first mode, in order to perform switching from the first mode to the second mode, the inspection control section 30 generates a second communication request giving an instruction to perform writing of the control program. The second communication request has a data size larger than that of the first communication request. The inspection control section 30 directly transmits, to the transmission flow control section 32, the generated second communication request and an identification signal giving an instruction to perform switching from the first mode to the second mode.

The mode determination table 60 stores types of identification signals and patterns of mode switching in accordance with the identification signals. When receiving the second communication request and the identification signal, the transmission flow control section 32 identifies the pattern of mode switching in accordance with the received identification signal by referring to the mode determination table 60. By so doing, the transmission flow control section 32 recognizes that the received identification signal is an identification signal giving an instruction to perform switching from the first mode to the second mode and recognizes that the received communication request is the second communication request.

Figure 5A:
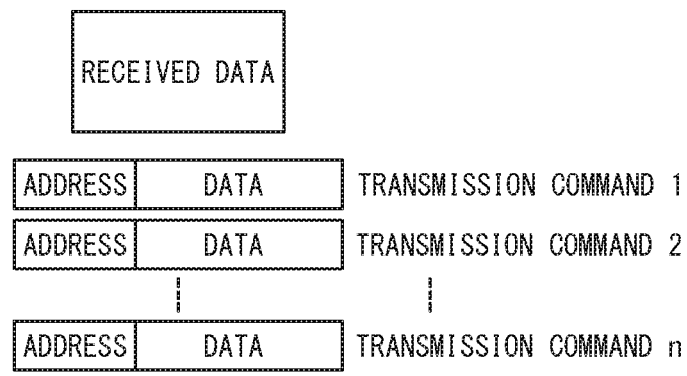
FIG. 5A is a diagram showing a case where a second communication request received by a request transmission destination registering section of FIG. 3 is divided into a plurality of pieces of packet data.

As described above, the second communication request has a data size larger than that of the first communication request. For this reason, as shown in FIG. 5A, the transmission flow control section 32 divides the second communication request, which is the received data, into a plurality of pieces of packet data (transmission commands), each having a size transmittable from the vehicle communication section 50 to the vehicle 12 to be performed. As in the case of the first communication request, the second communication request includes, for example, a second address for identifying the ECU 24 which is a transmission destination (an object on which writing is to be performed) and a second command in which an instruction to write the control program to the ECU 24 is described. Thus, in FIG. 5A, a case where the received second communication request is divided into a plurality of pieces of packet data (transmission commands 1 to n), each including the second address and the second command, is illustrated.

Figure 5B:
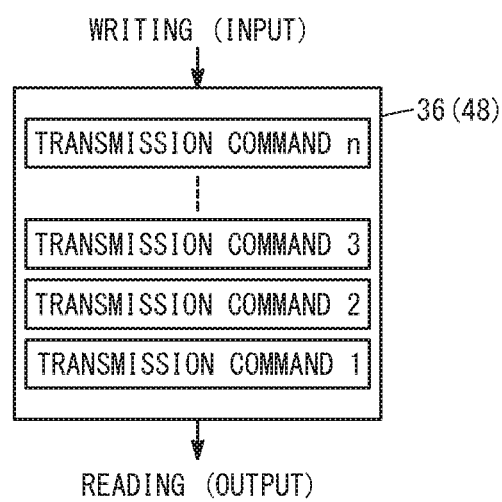
FIG. 5B is a diagram showing a case where the packet data of FIG. 5A is stored in a transmission buffer for high-speed communication.

Then, the transmission flow control section 32 of FIG. 2 notifies the communication request transmitting section 38 that the first mode has been switched to the second mode and temporarily stores the plurality of pieces of packet data sequentially in the transmission buffer for high-speed communication 36. As depicted in FIG. 5B, the transmission buffer for high-speed communication 36 is a FIFO buffer that outputs the sequentially written pieces of packet data (transmission commands 1 to n) to the communication request transmitting section 38 in the order in which the pieces of packet data (transmission commands 1 to n) were written. The plurality of pieces of packet data are transmitted to one and the same ECU 24 to give an instruction to rewrite the control program. Therefore, the transmission flow control section 32 may sequentially write only a plurality of second commands to the transmission buffer for high-speed communication 36.

The communication request transmitting section 38 of FIG. 2 recognizes that the first mode has been switched to the second mode based on the contents of notification from the transmission flow control section 32, and sequentially reads the plurality of pieces of packet data temporarily stored in the transmission buffer for high-speed communication 36 and transmits the pieces of packet data to the communication request receiving section 44. Moreover, the communication request transmitting section 38 may notify the communication request receiving section 44 of the contents of notification from the transmission flow control section 32 along with the plurality of pieces of packet data.

The communication request receiving section 44 recognizes that the first mode has been switched to the second mode based on the contents of notification from the communication request transmitting section 38 and temporarily stores the sequentially received pieces of packet data in the reception buffer for high-speed communication 48. The communication request receiving section 44 may notify the vehicle communication section 50 of the received contents of notification. Moreover, as in the case of the transmission buffer for high-speed communication 36, as depicted in FIG. 5B, the reception buffer for high-speed communication 48 is a FIFO buffer that outputs the sequentially written pieces of packet data to the vehicle communication section 50 in the order in which the pieces of packet data were written. Furthermore, the transmission buffer for high-speed communication 36 and the reception buffer for high-speed communication 48 are also configured as cache memory based on the serial communication standards.

The vehicle communication section 50 of FIG. 2 reads the plurality of pieces of packet data temporarily stored in the reception buffer for high-speed communication 48 and transmits the sequentially read packet data to the ECU 24, which is the transmission destination, via the connector 26 and the first to third communication lines 18, 20, and 22. As a result, in the ECU 24 which is the transmission destination, writing of the control program is performed based on the sequentially received pieces of packet data and details of a reply indicating the writing result (the completion of writing) are sequentially transmitted, as a second response, to the vehicle communication section 50 via the first to third communication lines 18, 20, and 22 and the connector 26. The second response has a data size smaller than that of the second communication request.

Moreover, when a plurality of pieces of packet data (the second communication request) are transmitted to the ECU 24, which is the transmission destination, in the second mode, the communication line connected to the ECU 24 which is the transmission destination is occupied as a communication line for transmitting and receiving the second communication request and the second response between the vehicle inspection device 10 and the ECU 24 which is the transmission destination. Thus, during the second mode, the other ECU 24 connected to that communication line cannot transmit and receive the first communication request and the first response. If the mode is the first mode or when the second mode is switched to the first mode, all the ECUs 24 connected to that communication line can transmit and receive the first communication request and the first response.

The vehicle communication section 50 temporarily stores the sequentially received second responses in the communication result transmission buffer 52. The communication result transmission buffer 52 outputs the sequentially written second responses to the communication result transmitting section 54 in the order in which the second responses were written. The communication result transmitting section 54 sequentially reads the second responses temporarily stored in the communication result transmission buffer 52 and transmits the read second responses to the communication result receiving section 40.

The communication result receiving section 40 temporarily stores the sequentially received second responses in the communication result reception buffer 42. The communication result reception buffer 42 outputs the sequentially written second responses to the inspection control section 30 in the order in which the second responses were written. The inspection control section 30 reads the second responses temporarily stored in the communication result reception buffer 42 at irregular intervals in the order in which the second responses were written and checks the details of the read second responses.

When the inspection control section 30 transmits, to the transmission flow control section 32, an identification signal giving an instruction to perform switching from the second mode to the first mode, the transmission flow control section 32 can recognize switching from the second mode to the first mode by identifying the pattern of mode switching in accordance with the received identification signal by referring to the mode determination table 60. As a result, as in the case of switching from the first mode to the second mode, a downstream side from the transmission flow control section 32 and a first response receiving side in the vehicle inspection device 10 can perform the above-described operations in the first mode.

2.3 Configuration of the Transmission Flow Control Section 32 and so Forth

Figure 3:
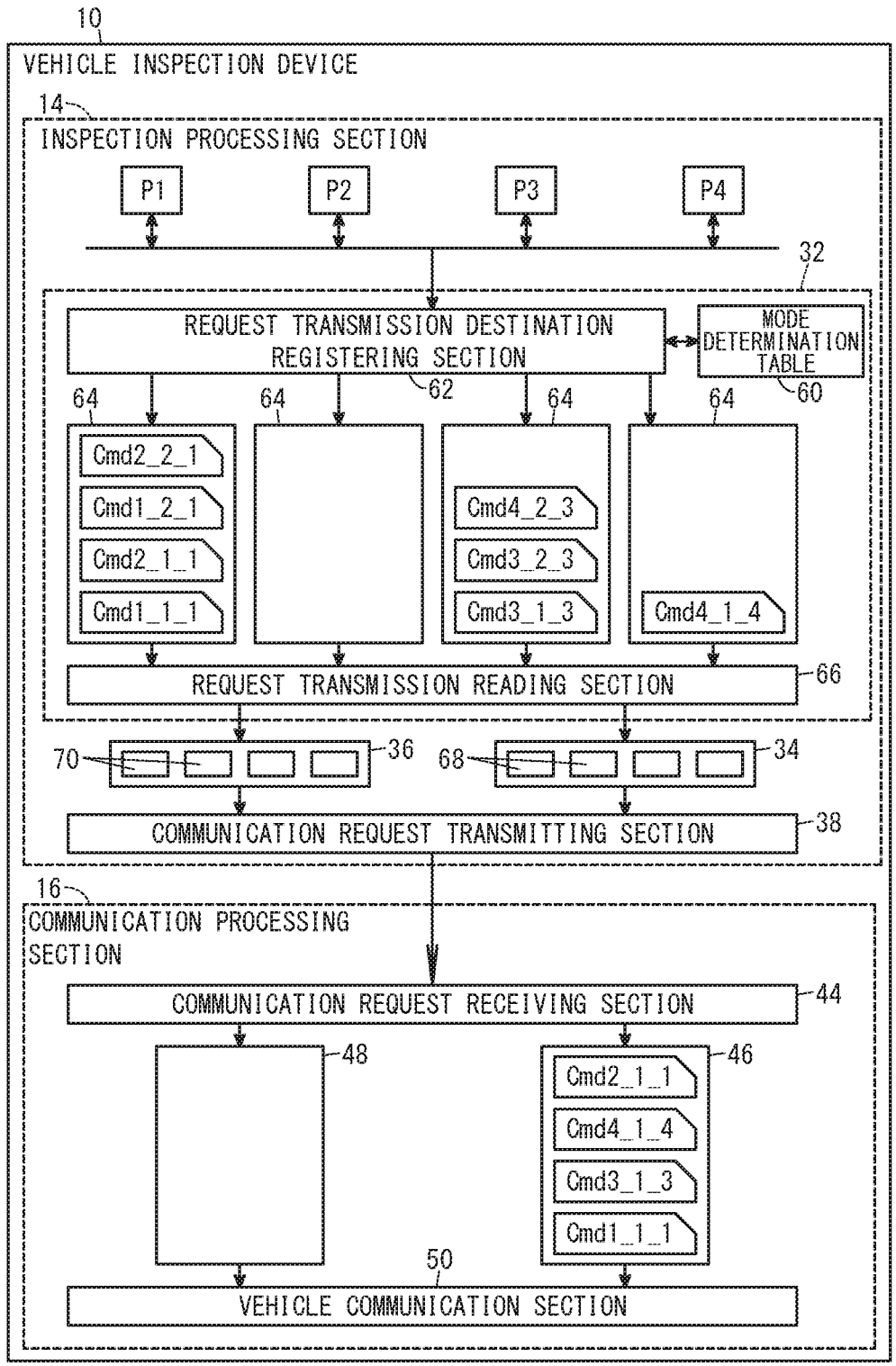
FIG. 3 is a block diagram of the inspection processing section and the communication processing section in a case where a memory area and the like are provided for each ECU.

FIG. 3 is a block diagram of the inspection processing section 14 and the communication processing section 16, illustrating the inside of the transmission flow control section 32 in detail. FIG. 3 illustrates the configuration of the side of the vehicle inspection device 10 where the communication requests (the first communication request and the second communication request) are transmitted to the vehicle 12.

The transmission flow control section 32 includes the mode determination table 60, a request transmission destination registering section 62, a plurality of buffers 64, each being a memory area provided for a corresponding one of the ECUs 24, and a request transmission reading section 66. Moreover, the communication request transmission buffer 34 and the transmission buffer for high-speed communication 36 respectively include memory areas 68 and 70, each being provided for a corresponding one of the ECUs 24. That is, in FIG. 3, for four ECUs 24 installed in the vehicle 12, each of the transmission flow control section 32, the communication request transmission buffer 34, and the transmission buffer for high-speed communication 36 has memory areas, each being provided for a corresponding one of the four ECUs 24.

When a new communication request (the first communication request or the second communication request) is generated by the inspection control section 30, the request transmission destination registering section 62 identifies the ECU 24 to which the communication request has to be transmitted by checking the address (the first address or the second address) included in the communication request. Then, the request transmission destination registering section 62 temporarily stores the communication request in the buffer 64 corresponding to the ECU 24 indicated by the address. Moreover, when the identification signal is transmitted from the inspection control section 30, the request transmission destination registering section 62 determines, by using the mode determination table 60, whether or not the inspection control section 30 has given an instruction to perform switching of the mode. Each buffer 64 is a FIFO buffer from which the communication requests are output in the order in which the communication requests were written.

In FIG. 3, "Cmdi_j_k" denotes the communication request. "i" means that this is the communication request generated as a result of the i-th inspection program of the inspection programs P1 to Pm having been executed. Moreover, "j" means that this is the communication request generated in the j-th execution of the inspection programs P1 to Pm. Furthermore, "k" means that this is the communication request whose transmission destination is the k-th ECU 24.

The request transmission reading section 66 reads the communication request temporarily stored in each buffer 64 in accordance with a scan order previously set for each of the plurality of buffers 64 and, based on the address included in the read communication request, writes the communication request to the memory area 68 or 70, corresponding to each ECU 24, of the communication request transmission buffer 34 or the transmission buffer for high-speed communication 36. In this case, if the request transmission destination registering section 62 determines that the current mode is the first mode, the request transmission reading section 66 recognizes that the read communication request is the first communication request and temporarily stores the first communication request in the memory area 68, for the corresponding ECU 24, of the communication request transmission buffer 34. On the other hand, if the request transmission destination registering section 62 determines that the current mode is the second mode, the request transmission reading section 66 recognizes that the read communication request is the second communication request and temporarily stores the second communication request in the memory area 70, for the corresponding ECU 24, of the transmission buffer for high-speed communication 36.

For this reason, based on the contents of notification from the transmission flow control section 32, the communication request transmitting section 38 sequentially reads the first communication requests from the appropriate memory area 68 of the communication request transmission buffer 34 and transmits the read first communication requests to the communication request receiving section 44 or sequentially reads the second communication requests from the appropriate memory area 70 of the transmission buffer for high-speed communication 36 and transmits the read second communication requests to the communication request receiving section 44. This allows the communication request receiving section 44 to temporarily store the sequentially received first communication requests in the communication request reception buffer 46 or temporarily store the sequentially received second communication requests in the reception buffer for high-speed communication 48 based on the contents of notification from the communication request transmitting section 38.

Therefore, in the configuration of FIG. 3, since switching to the first mode or the second mode can be performed for each of the plurality of ECUs 24, it is possible to perform an inspection of one ECU 24 and writing of the control program to the same ECU 24 in different time periods, for example. Moreover, for a plurality of ECUs 24 connected to the same communication line, it is also possible to perform inspections on the plurality of ECUs 24 and then perform writing of the control program only on an arbitrary ECU 24.

2.4 Configuration of the Vehicle Inspection Device 10 when there is More than One Communication Line The configuration of FIGS. 2 and 3 is the configuration of the vehicle inspection device 10 for performing transmission and reception of data between the vehicle inspection device 10 and the vehicle 12 when a plurality of ECUs 24 are connected to one communication line. When there are the first to third communication lines 18, 20, and 22 as in FIG. 1, the vehicle inspection device 10 only has to be configured as depicted in FIG. 4.

Figure 4:
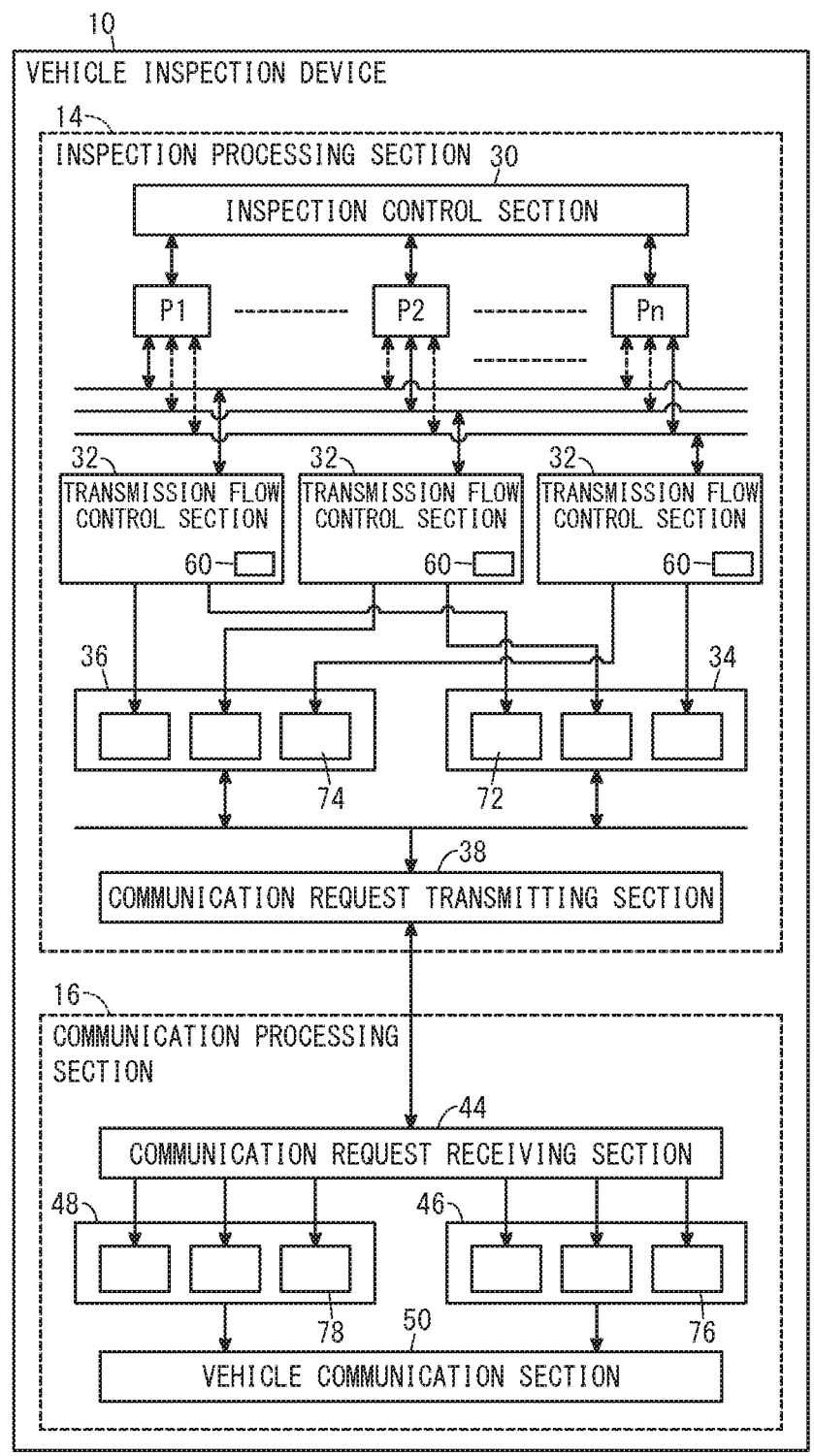
FIG. 4 is a block diagram of the inspection processing section and the communication processing section in a case where a memory area and the like are provided for each of a plurality of communication lines.

In FIG. 4, the transmission flow control section 32 is provided for each of the first to third communication lines 18, 20, and 22. Furthermore, the communication request transmission buffer 34, the transmission buffer for high-speed communication 36, the communication request reception buffer 46, and the reception buffer for high-speed communication 48 have memory areas 72, 74, 76, and 78, respectively, each being provided for a corresponding one of the first to third communication lines 18, 20, and 22. Therefore, the inspection control section 30 performs switching between the first mode and the second mode for each of the first to third communication lines 18, 20, and 22. Moreover, each of the three transmission flow control sections 32 determines the presence or absence of switching of the first mode or the second mode by using the mode determination table 60.

Furthermore, each of the transmission flow control sections 32 writes the communication request (the first communication request or the second communication request) to the corresponding memory area 72 or 74 of the communication request transmission buffer 34 or the transmission buffer for high-speed communication 36. In addition, the communication request transmitting section 38 reads the communication request from the corresponding memory area 72 or 74 of the communication request transmission buffer 34 or the transmission buffer for high-speed communication 36 and transmits the read communication request to the communication request receiving section 44. The communication request receiving section 44 writes the received communication request to the corresponding memory area 76 or 78 of the communication request reception buffer 46 or the reception buffer for high-speed communication 48. Thus, in the configuration of FIG. 4, since switching to the first mode or the second mode can be performed for each of the first to third communication lines 18, 20, and 22, it is possible to perform concurrently an inspection of the ECU 24 connected to one communication line and writing of the control program to the ECU 24 connected to another communication line, for example.

In the vehicle inspection device 10, it is also possible to provide a memory area for each of the first to third communication lines 18, 20, and 22 and each of the plurality of ECUs 24 by combining the configurations of FIGS. 3 and 4.

3. Operation of the Present Embodiment

An operation (a vehicle inspection method) of the vehicle inspection device 10, which is configured as described above, according to the present embodiment will be described with reference to FIGS. 6 to 13. The following description of the operation will be given with reference also to FIGS. 1 to 5B.

3.1 Operation in the First Mode

First, a case where the vehicle inspection device 10 operates in the first mode will be described with reference to FIG. 6. The operation in the first mode is basically the same as the operation of the vehicle inspection device of Japanese Laid-Open Patent Publication No. 2016-151471.

FIG. 6 is a sequence diagram showing the flow of transmission of the first communication request and reception of the first response when pass or fail of a plurality of inspection items is determined in the first mode. In this case, it is assumed that the number of inspection items on which a determination is to be made (the number of inspection programs P1 to Pm to be executed) is four and the total number of ECUs 24 installed in the vehicle 12 (see FIG. 1) is four. Moreover, it is assumed that the number of first communication requests which can be concurrently processed in the communication processing section 16 (the number of first communication requests which can be accepted by the communication processing section 16) is two. Furthermore, for convenience of explanation, it is assumed that, after transmitting the first communication request to the ECU 24 which is the transmission destination, the communication processing section 16 does not transmit the first communication request to the same ECU 24 until the communication processing section 16 receives the first response from the ECU 24.

Moreover, in FIG. 6, the four inspection programs P1 to P4 are executed from the inspection program of the lowest number. In this case, it is assumed that each of the four inspection programs P1 to P4 performs two operations of transmission and reception of the first communication request and the first response between the vehicle inspection device 10 (see FIG. 1) and the vehicle 12. Furthermore, it is assumed that, between the inspection processing section 14 and the communication processing section 16, transmission and reception of the first communication request and the first response are regularly performed with a fixed period by the above-described serial communications.

In FIG. 6, "Resi_j_k" denotes the first response. "i" means that this is the first response to the first communication request which is generated as a result of the i-th inspection program of the inspection programs P1 to Pm having been executed. Moreover, "j" means that this is the first response to the first communication request generated in the j-th execution of the inspection programs P1 to Pm. Furthermore, "k" means that this is the first response whose transmission source is the k-th ECU 24 (see FIG. 1).

First, the four inspection programs P1 to P4 are sequentially executed by the inspection control section 30 (see FIGS. 2 and 4). As a result, first communication requests Cmd1_1_1, Cmd2_1_1, Cmd3_1_3, and Cmd4_1_4 corresponding to the inspection programs P1 to P4 in the first execution are sequentially generated. Here, two first communication requests Cmd1_1_1 and Cmd2_1_1, which are transmitted to a first ECU 24 (ECU1) of the four ECUs 24, are consecutively generated.

Then, the generated first communication requests are written to the buffers 64, each being provided for a corresponding one of the ECUs 24, by the request transmission destination registering section 62 (see FIG. 3). The request transmission reading section 66 reads the first communication requests stored in the buffers 64 in accordance with a scan order set for each ECU 24. As a result, in the first communication period (a first period), two first communication requests Cmd1_1_1 and Cmd3_1_3 are transmitted to the communication processing section 16 from the inspection processing section 14 (the transmission flow control section 32). The first communication request Cmd1_1_1 is the communication request to the first ECU 24, and the first communication request Cmd3_1_3 is the communication request to the third ECU 24 (ECU5).

In this case, the communication processing section 16 transmits the first communication request Cmd3_1_3 to the third ECU 24 without waiting for a first response Res1_1_1 to the first communication request Cmd1_1_1. This makes it possible to operate two ECUs 24 concurrently for an inspection between the first communication period and the second communication period (a second period).

Moreover, in the second communication period, the communication processing section 16 receives the first responses to the two first communication requests transmitted in the first communication period. Therefore, the number of first communication requests which can be newly accepted in the second communication period is two. As a result, it is possible to newly transmit the first communication requests Cmd2_1_1 and Cmd4_1_4 to two different ECUs 24 between the second communication period and the third communication period (a third period).

Then, in and after the third communication period, in a manner similar to that described above, the first communication requests are transmitted to two new ECUs 24 and the first responses to the first communication requests transmitted in the previous communication period are received. As described above, in the first mode, even when the first communication requests to one ECU 24 are generated in a stroke, the sequence of transmission of the first communication requests is changed so that the plurality of ECUs 24 operate concurrently. As a result, by reducing the number of communications which are performed between the inspection processing section 14 and the communication processing section 16 until the completion of the four inspection programs P1 to P4, it is possible to reduce the time taken to perform an inspection.

3.2 Switching Operation Between the First Mode and the Second Mode

Next, a switching operation between the first mode and the second mode will be described with reference to a flowchart of FIG. 7. In the following description, a case where the first mode is switched to the second mode when the vehicle inspection device 10 (see FIG. 1) is operating in the first mode will be mainly described. The operation of the flowchart of FIG. 7 is principally performed by the inspection processing section 14.

First, in Step S1 (a first step) of FIG. 7, the inspection control section 30 (see FIGS. 2 and 4) generates the communication request (the first communication request or the second communication request). The inspection control section 30 transmits the generated communication request and an identification signal to the transmission flow control section 32 (see FIGS. 2 to 4). The request transmission destination registering section 62 of the transmission flow control section 32 receives the communication request and the identification signal from the inspection control section 30.

In next Step S2, the request transmission destination registering section 62 identifies the pattern of mode switching corresponding to the received identification signal by referring to the mode determination table 60. Then, if the received identification signal is an identification signal giving an instruction to perform switching from the first mode to the second mode (Step S2: YES), the request transmission destination registering section 62 proceeds to next Step S3.

In Step S3, the request transmission destination registering section 62 recognizes that the received communication request is the second communication request and generates second transmission commands by dividing the second communication request into a plurality of pieces of packet data. The generated second transmission commands are stored in the buffer 64 for the ECU 24 corresponding to the second address included in the second transmission commands.

In Step S4, the request transmission destination registering section 62 determines whether or not reception of the second communication request is completed. If the second communication request is being received from the inspection control section 30 (Step S4: NO), the request transmission destination registering section 62 goes back to Step S3 and repeatedly generates the second transmission commands from the received second communication request. In this way, as a result of the processing in Steps S3 and S4 being repeatedly performed, the plurality of pieces of packet data are sequentially written to the buffer 64 as the second transmission commands.

Then, if reception of the second communication request from the inspection control section 30 is completed (Step S4: YES), the procedure proceeds to next Step S5 (a second step). In Step S5, the request transmission reading section 66 sequentially reads the plurality of second transmission commands from the buffer 64 and sequentially writes the second transmission commands to the transmission buffer for high-speed communication 36.

In next Step S6 (a third step), the communication request transmitting section 38 sequentially reads the plurality of second transmission commands temporarily stored in the transmission buffer for high-speed communication 36 and transmits the second transmission commands to the communication processing section 16. Thus, in the communication processing section 16, after the sequentially received second transmission commands are written to the reception buffer for high-speed communication 48, the second transmission commands are transmitted from the vehicle communication section 50 to the ECU 24 on which writing is to be performed. As a result, in the ECU 24 on which writing is to be performed, the control program is rewritten based on the sequentially received second transmission commands.

On the other hand, in Step S2, if the received identification signal is an identification signal giving an instruction to perform switching from the second mode to the first mode or there is no reception of an identification signal giving an instruction to perform switching from the first mode to the second mode (Step S2: NO), the procedure proceeds to Step S7.

In Step S7, the request transmission destination registering section 62 recognizes that the received communication request is the first communication request and generates the first transmission command from the first communication request. The generated first transmission command is stored in the buffer 64 for the ECU 24 corresponding to the first address included in the first transmission command. If the data size of the first communication request is large to some extent, as in the case of the second communication request, the first communication request may also be divided into a plurality of pieces of packet data (first transmission commands), each having a size transmittable from the vehicle communication section 50 to the vehicle 12 to be performed.

In Step S8, the request transmission destination registering section 62 determines whether or not reception of the first communication request is completed. If the first communication request is being received from the inspection control section 30 (Step S8: NO), the request transmission destination registering section 62 goes back to Step S7 and repeatedly generates the first transmission command from the received first communication request. In this way, as a result of the processing in Steps S7 and S8 being repeatedly performed, a plurality of first transmission commands are sequentially written to the buffer 64.

Then, if reception of the first communication request from the inspection control section 30 is completed (Step S8: YES), the procedure proceeds to Step S9 (the second step). In Step S9, the request transmission reading section 66 sequentially reads the plurality of first transmission commands from the buffer 64 and sequentially writes the read first transmission commands to the communication request transmission buffer 34.

Then, in Step S6, the communication request transmitting section 38 sequentially reads the plurality of first transmission commands temporarily stored in the communication request transmission buffer 34 and transmits the read first transmission commands to the communication processing section 16. As a result, in the communication processing section 16, after the sequentially received first transmission commands are written to the communication request reception buffer 46, the first transmission commands are transmitted to the ECU 24 to be inspected from the vehicle communication section 50. As a result, the ECU 24 to be inspected can perform a predetermined inspection based on the sequentially received first transmission commands.

3.3 Advantages of Switching Between the First Mode and the Second Mode

Next, advantages of switching between the first mode and the second mode will be described with reference to FIGS. 8 to 13.

Figure 8:
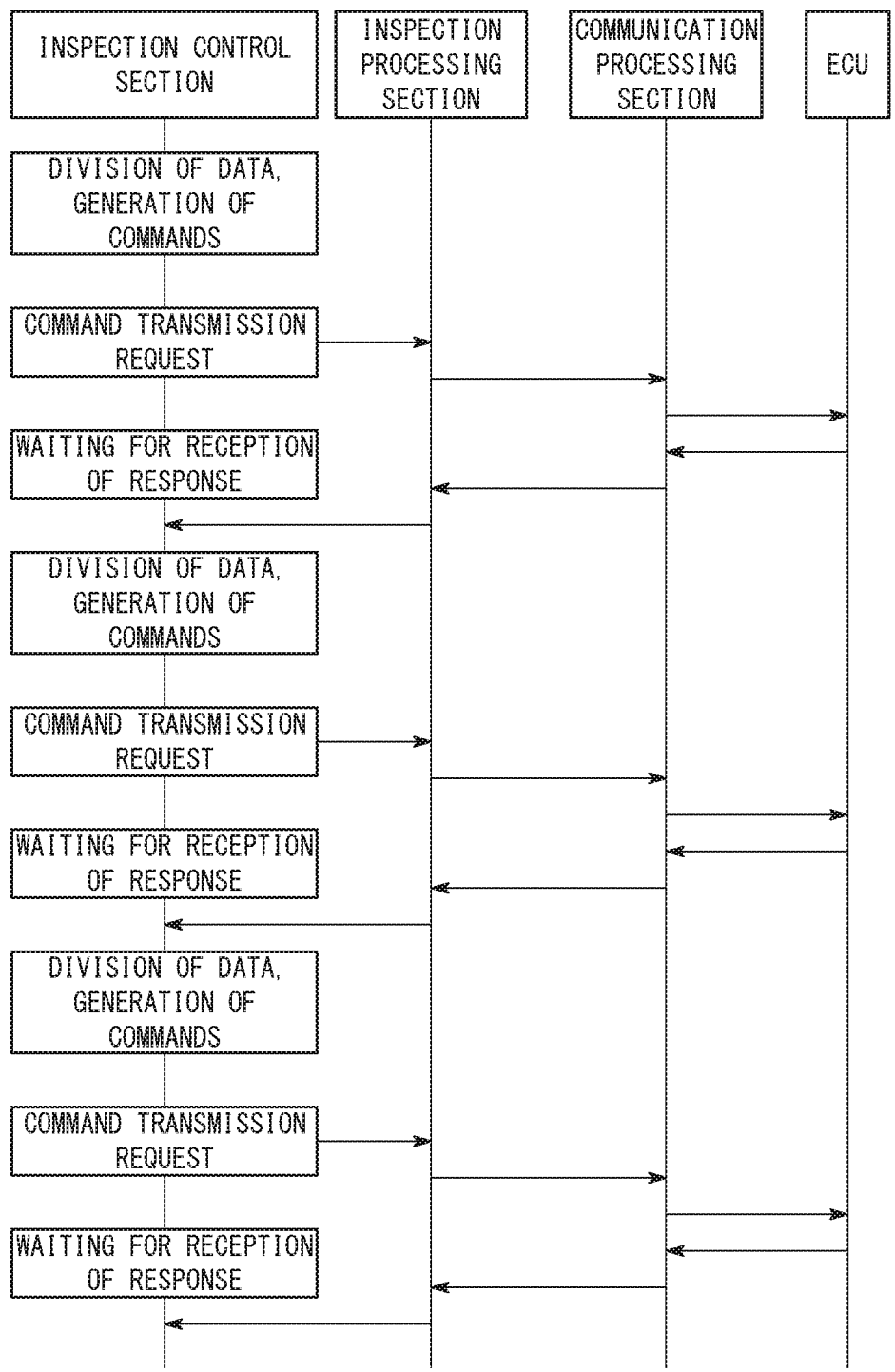
FIG. 8 is a sequence diagram of the first mode.

FIG. 8 is a sequence diagram showing transmission and reception of the first communication request and the first response in the first mode. In the first mode, as a result of the inspection control section 30 (see FIGS. 2 and 4) starting execution of the inspection programs P1 to Pm, a transmission operation of the first communication request is started, and, as a result of the first response, which was transmitted from the ECU 24 (see FIG. 1), to the first communication request being received by the inspection control section 30, execution of the inspection programs P1 to Pm is completed. That is, in the first mode, transmission of the first communication request and reception of the first response are synchronized. For this reason, for one ECU 24, until execution of one inspection program of the inspection programs P1 to Pm is completed, the next inspection program of the inspection programs P1 to Pm cannot be executed.

Figure 9:
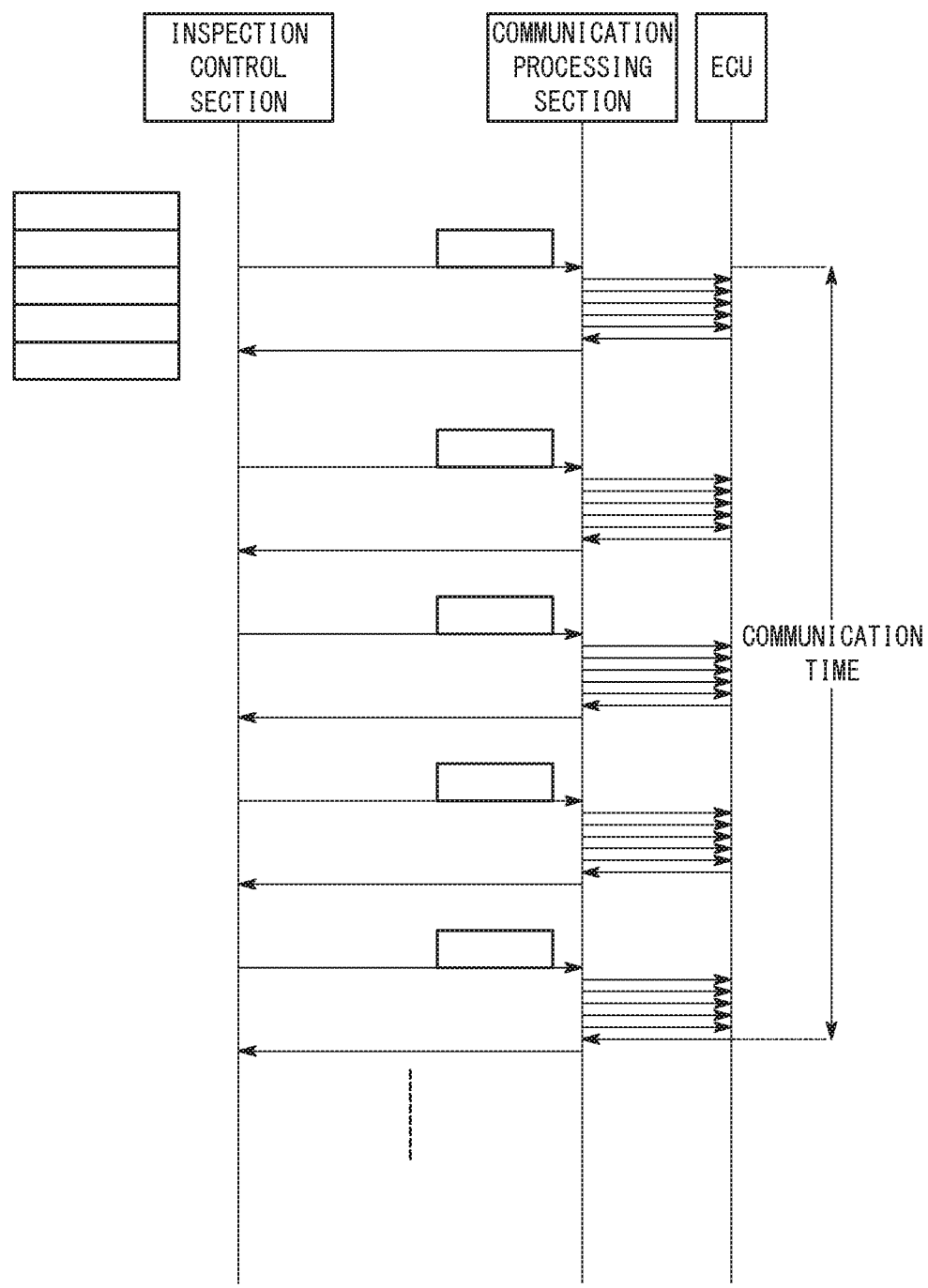
FIG. 9 is a sequence diagram of the first mode.

FIG. 9 is a sequence diagram showing transmission and reception of the first communication request and the first response in the first mode in terms of a data size. In the first mode, the data size of the first response is larger than the data size of the first communication request (the first transmission command). Specifically, the first communication request is instruction data that gives an instruction to perform acquisition of data in the vehicle 12 (see FIG. 1); meanwhile, the first response is the data actually acquired from the vehicle 12.

Moreover, as shown in FIG. 9, on the side where the inspection control section 30 (see FIGS. 2 and 4) is located, the first communication request is divided into a plurality of pieces of packet data and the plurality of pieces of devided packet data are transmitted, as first transmission commands, to the side where the vehicle communication section 50 is located. In FIG. 9, a plurality of blocks stacked on the side where the inspection control section 30 is located represent the first communication requests, and a block which is transmitted from the inspection control section 30 to the communication processing section 16 represents each of the plurality of pieces of devided packet data.

To perform communications between the vehicle communication section 50 (see FIGS. 2 to 4) and the plurality of ECUs 24 efficiently, the vehicle communication section 50 further divides the first transmission command into packets, each having a data size transmittable to be performed via the first to third communication lines 18, 20, and 22, and transmits the packets to the ECU 24 to be inspected. The ECU 24 transmits the communication result for the received packets to the inspection control section 30 as the first response. As a result, in the first mode, when the plurality of inspection programs P1 to Pm are executed and the first communication requests are transmitted, it takes time for the vehicle inspection device 10 and the ECU 24 to be inspected to communicate with each other.

Figure 10:
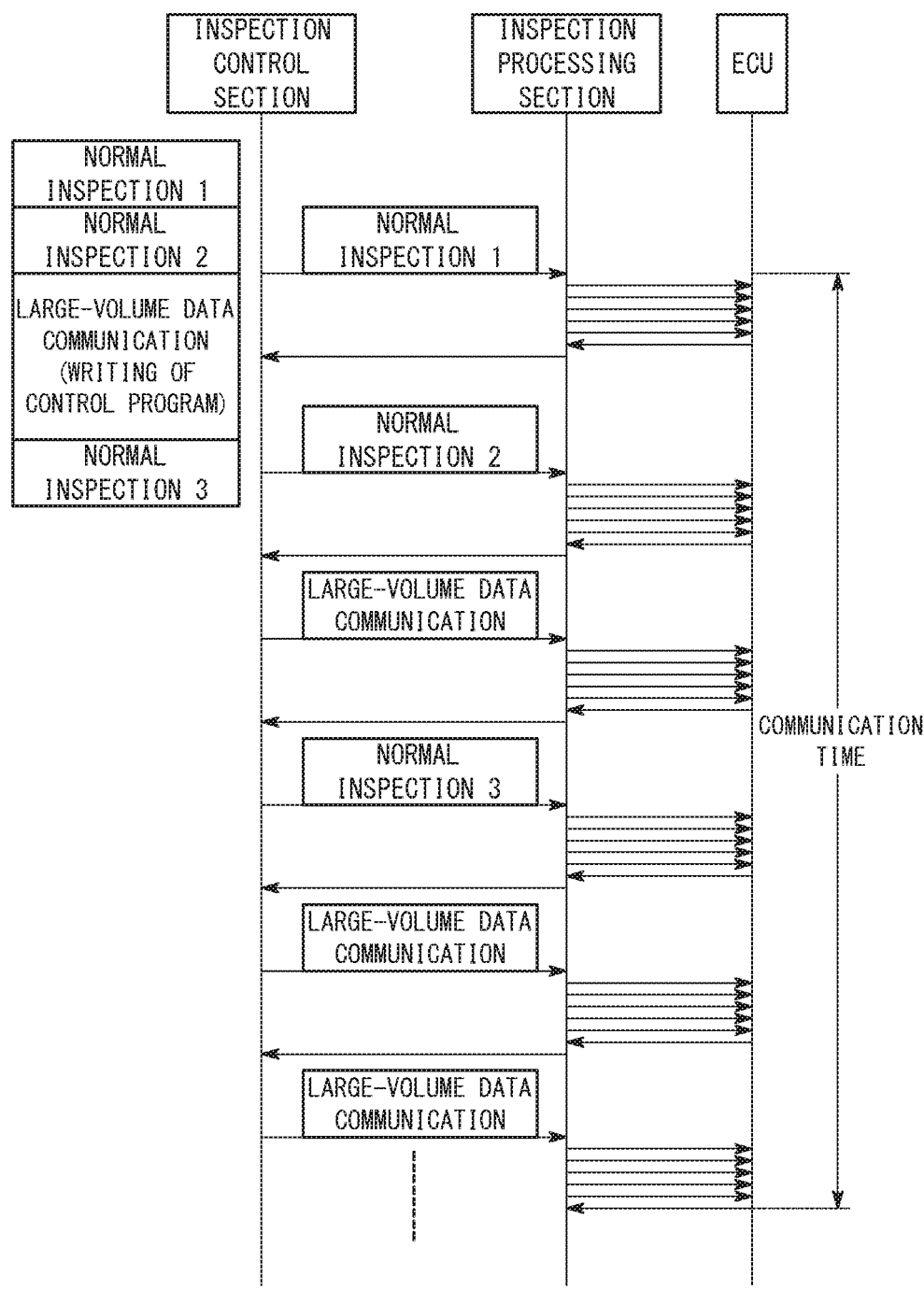
FIG. 10 is a sequence diagram of the first mode.

FIG. 10 is a sequence diagram illustrating a case where, in a state of the first mode, the first communication request and large-volume data, such as an instruction to rewrite the control program, are transmitted to the ECU 24 (see FIG. 1). In this case, for the large-volume data, the large-volume data is divided into a plurality of pieces of data of small size, and the pieces of data are transmitted, between the time periods of transmission and reception of the first communication request and the first response, to the ECU 24 on which writing is to be performed. In FIG. 10, a plurality of blocks stacked on the side where the inspection control section 30 (see FIGS. 2 and 4) is located represent the first communication requests (normal inspections 1 to 3) and the second communication request (large-volume data communication). Moreover, in the case of FIG. 10, since the large-volume data is transmitted on a piecemeal basis, it actually takes time for the vehicle inspection device 10 and the vehicle 12 to communicate with each other.

Figure 11:
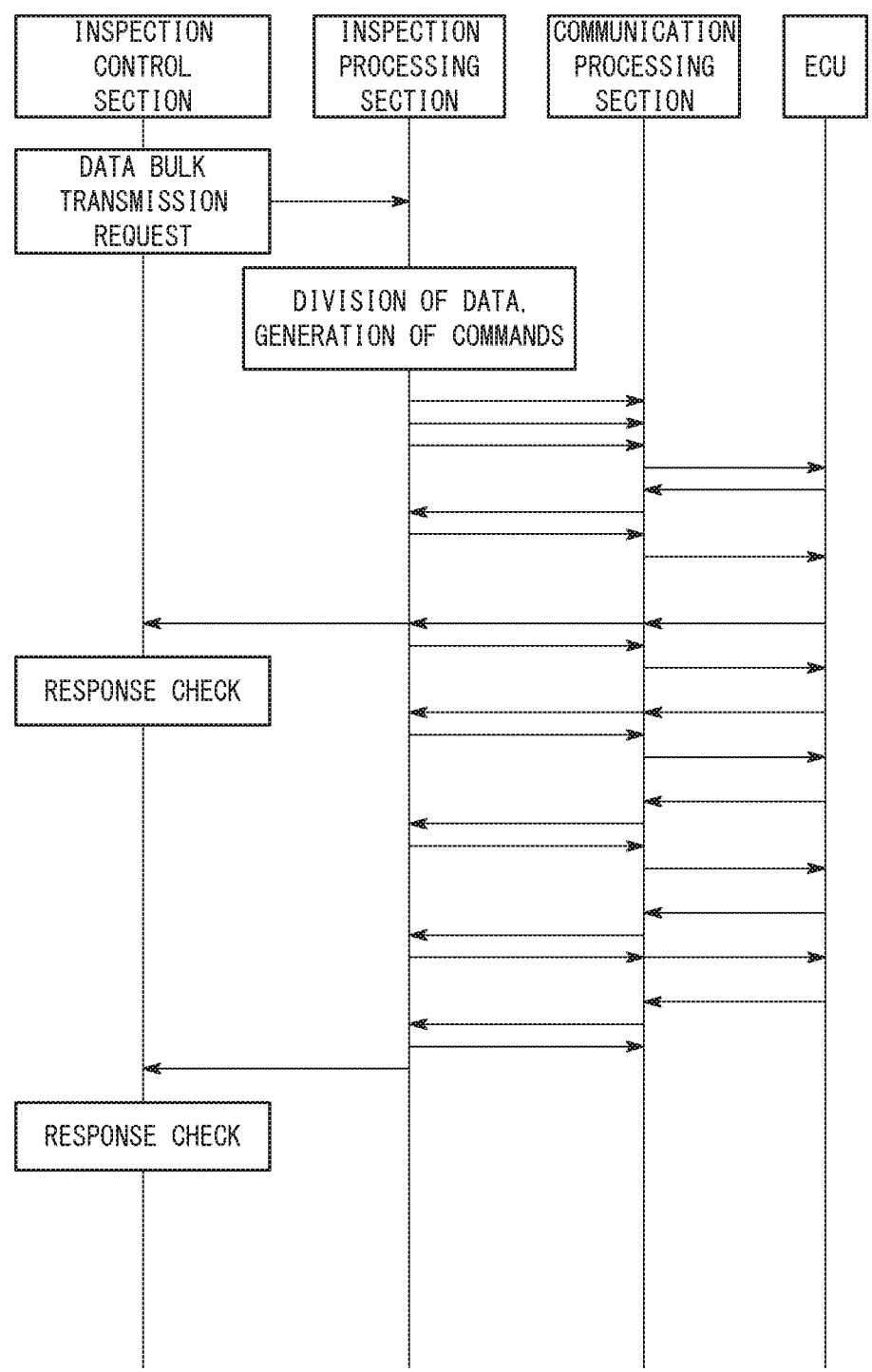
FIG. 11 is a sequence diagram of the second mode.

On the other hand, in the second mode shown in FIG. 11, even when the second communication request is transmitted to the ECU 24 (see FIG. 1), the second response is temporarily accumulated in the communication result reception buffer 42 (see FIG. 2). The inspection control section 30 (see FIGS. 2 and 4) reads the second responses from the communication result reception buffer 42 at irregular intervals when necessary and checks the second responses. That is, in the second mode, transmission and reception of the second communication request and the second response are not synchronized. Therefore, in the second mode, it is possible to perform communication processing by using the transmission buffer for high-speed communication 36 (see FIGS. 2 to 4) and the like without being affected by the inspection programs P1 to Pm. A check in the inspection control section 30 may be performed at irregular intervals as described above or may be performed in a state in which transmission of the second communication request is temporarily stopped.

Figure 12:
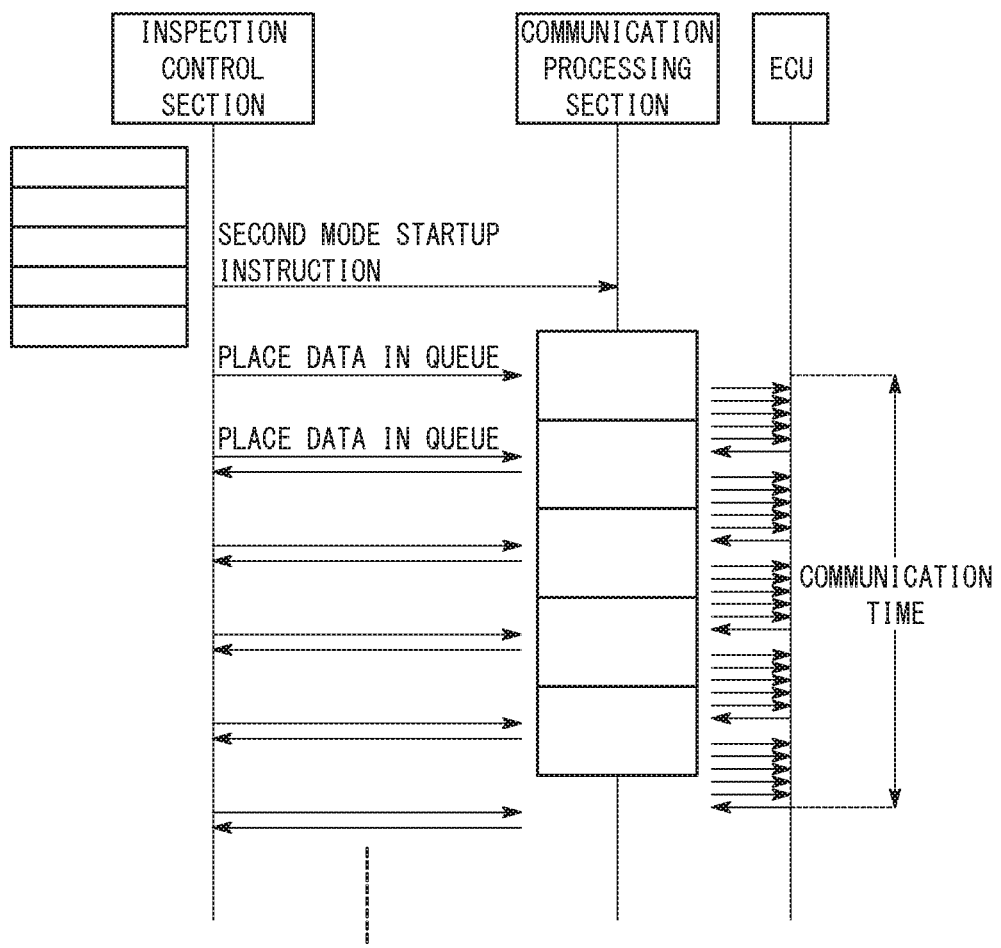
FIG. 12 is a sequence diagram of the second mode.

Moreover, as shown in FIG. 12, in the second mode, the data size of the second transmission command is larger than the data size of the second response. Thus, by temporarily storing the second transmission commands in the transmission buffer for high-speed communication 36 (see FIGS. 2 to 4) and the reception buffer for high-speed communication 48 and transmitting the second transmission commands to the ECU 24 (see FIG. 1) at once during the second mode, it is possible to reduce the communication time between the vehicle communication section 50 and the ECU 24.

Furthermore, as shown in FIG. 13, in the present embodiment, the second transmission commands, which are large-volume data, are transmitted in a state in which the first mode is switched to the second mode. That is, in the first mode, the first communication requests are transmitted at once to the ECU 24 (see FIG. 1); in the second mode, the second communication requests are transmitted at once to the ECU 24. As a result, compared to a case where transmission and reception of all the data are performed in the state of the first mode, it is possible to reduce the communication time between the vehicle communication section 50 (see FIGS. 2 to 4) and the ECU 24.

4. Effects of the Present Embodiment

As described above, the vehicle inspection device 10 and the vehicle inspection method according to the present embodiment make it possible to perform write processing of the control program without executing the inspection programs P1 to Pm. Thus, in the write processing, even when the second response to the second communication request is received, a determination on the second response does not have to be made immediately. This makes it possible to reduce the time of the write processing.

Moreover, when writing of the control program is performed on an arbitrary ECU 24, in a time period in which an inspection of the ECU 24 is not performed, only the second communication requests of large data size are transmitted at once to the ECU 24. As a result, compared to a case where the control program is written on a piecemeal basis during the inspection of the ECU 24, it is possible to reduce the time of the write processing.

Furthermore, the communication processing section 16 can also perform an inspection of the ECU 24 to be inspected by transmitting the first communication request to the ECU 24 and perform write processing on the ECU 24 on which writing is to be performed, which is different from the ECU 24 to be inspected, by transmitting the second communication request thereto. As a result, when there are a plurality of ECUs 24, it is possible to concurrently perform an inspection of one ECU 24 and write processing of the control program on another ECU 24, which is different from the one ECU 24. This makes it possible to efficiently perform communications with the plurality of ECUs 24.

As described above, according to the present embodiment, it is possible to perform inspections of a plurality of ECUs 24 and writing of the control programs to the ECUs 24 in a short time and efficiently while using the existing communication system. This makes it possible to apply the present embodiment suitably to production lines and repair plants of different layouts.

Moreover, in the present embodiment, it is possible to transmit appropriate communication requests to the plurality of ECUs 24 in accordance with the mode to which the previous mode was switched by the inspection control section 30. That is, in accordance with the mode to which the previous mode was switched, the transmission flow control section 32 stores the communication requests generated by the inspection control section 30 either in the communication request transmission buffer 34 or in the transmission buffer for high-speed communication 36. As a result, when the communication request of the mode which is not selected by the inspection control section 30 is input to the transmission flow control section 32, the transmission flow control section 32 can enter a standby state without accepting the input communication request.

Furthermore, in the second mode, the transmission flow control section 32 divides the second communication request generated by the inspection control section 30 into a plurality of pieces of packet data, each having a data size transmittable to the ECU 24 on which writing is to be performed from the communication processing section 16 to be performed, and sequentially stores the plurality of pieces of devided packet data in the transmission buffer for high-speed communication 36. The communication request transmitting section 38 reads the plurality of pieces of packet data stored in the transmission buffer for high-speed communication 36 in the order in which the pieces of packet data were stored and transmits the read pieces of packet data to the communication processing section 16. Furthermore, the communication processing section 16 transmits, to the ECU 24 on which writing is to be performed, the plurality of pieces of packet data in the order in which the pieces of packet data were received from the communication request transmitting section 38. This makes it possible to make the transmission buffer for high-speed communication 36 store the second communication request (the plurality of pieces of packet data) with a simple configuration and at low cost.

In addition, in the communication processing section 16, the communication request reception buffer 46 temporarily stores the first communication request and the reception buffer for high-speed communication 48 temporarily stores the second communication request. In this case, in the first mode, the first communication request stored in the communication request reception buffer 46 is transmitted to the ECU 24 to be inspected and the first response to the first communication request is received from the ECU 24. Moreover, in the second mode, the second communication request stored in the reception buffer for high-speed communication 48 is transmitted to the ECU 24 on which writing is to be performed and the second response to the second communication request is received from the ECU 24. This makes it possible to perform an inspection of the ECU 24 to be inspected and writing of the control program to the ECU 24 on which writing is to be performed in a shorter time. Furthermore, it is possible to receive the first response and the second response reliably.

Moreover, as a result of the vehicle inspection device 10 having the configuration of FIG. 3, it is possible to perform inspections of the plurality of ECUs 24 and writing of the control programs thereto accurately in a short time. This makes it possible to perform efficiently an inspection of one ECU 24 or writing of the control program to the same ECU 24, for example. Alternatively, it is also possible to perform efficiently inspections of a plurality of ECUs 24 connected to the same communication line and writing of the control program to an arbitrary ECU 24 in a time period different from the time periods in which the inspections are performed.

Furthermore, as a result of the vehicle inspection device 10 having the configuration of FIG. 4, it is possible to perform an inspection of the ECU 24 and writing of the control program thereto for each of the first to third communication lines 18, 20, and 22 in a short time and efficiently. As a result, for instance, it is also possible to perform concurrently an inspection of the ECU 24 (the ECU 24 to be inspected) connected to one communication line and write processing on the ECU 24 (the ECU 24 on which writing is to be performed) connected to another communication line.

Moreover, since each of the communication request transmission buffer 34, the transmission buffer for high-speed communication 36, the communication request reception buffer 46, and the reception buffer for high-speed communication 48 is a FIFO buffer from which the first communication requests or the second communication requests are output in the order in which the communication requests were written, it is possible to perform inspections of the plurality of ECUs 24 and writing of the control programs thereto at high speed and efficiently.

In addition, since the vehicle inspection device 10 includes the communication result transmission buffer 52 and the communication result reception buffer 42, in the first mode, as a result of transmission of the first communication request and reception of the first response being performed, it is possible to perform inspections of the plurality of ECUs 24 reliably. Meanwhile, in the second mode, it is possible to check the second response without causing a delay in communications between the vehicle inspection device 10 and the plurality of ECUs 24.

Moreover, since the first response has a data size larger than that of the first communication request and the second response has a data size smaller than that of the second communication request, it is possible to perform inspections of the plurality of ECUs 24 and writing of the control programs thereto in a shorter time and more efficiently.

It goes without saying that the present invention is not limited to the above-described embodiment and can adopt various configurations based on the descriptions of this specification.

What is claimed is:

1. A vehicle inspection device comprising:
   an inspection processing section configured to generate a communication request to a plurality of electronic control units inside a vehicle by executing an arbitrary inspection program among inspection programs set in accordance with an inspection item about the vehicle; and
   a communication processing section configured to transmit the communication request to an electronic control unit to be inspected among a plurality of control units, and receive a response to the communication request from the electronic control unit to be inspected, wherein
   the inspection processing section determines pass or fail of the inspection item based on the response,
   the inspection processing section includes
   an inspection control section that
      generates, based on the inspection program, a first communication request to the electronic control unit to be inspected or generates a second communication request having a data size larger than a data size of the first communication request and giving an instruction to perform writing of a control program to an arbitrary electronic control unit of the plurality of electronic control units, and
      performs switching between a first mode in which an inspection is performed on the electronic control unit to be inspected and a second mode in which writing of the control program is performed on the electronic control unit on which writing is to be performed,
      a first buffer that stores the first communication request,
      a second buffer that stores the second communication request,
      a transmission flow control section configured to make the first buffer store, in the first mode, the first communication request generated by the inspection control section and make the second buffer store, in the second mode, the second communication request generated by the inspection control section, and
      a communication request transmitting section configured to transmit the first communication request stored in the first buffer to the communication processing section in the first mode and transmit the second communication request stored in the second buffer to the communication processing section in the second mode, and
   the communication processing section performs any one of transmission of the first communication request stored in the first buffer to the electronic control unit to be inspected and transmission of the second communication request stored in the second buffer to the electronic control unit on which writing is to be performed or both.

2. The vehicle inspection device according to claim 1, wherein
   in the second mode, the transmission flow control section is configured to divide the second communication request generated by the inspection control section into a plurality of pieces of packet data, each of the plurality of pieces of packet data having a data size transmittable to the electronic control unit on which writing is to be performed from the communication processing section, and store the plurality of pieces of divided packet data in the second buffer,
   the communication request transmitting section is configured to read the plurality of pieces of packet data stored in the second buffer in an order in which the pieces of packet data were stored and transmit the pieces of packet data to the communication processing section, and
   the communication processing section is configured to transmit the plurality of pieces of packet data to the electronic control unit on which writing is to be performed.

3. The vehicle inspection device according to claim 1, wherein
the communication processing section includes
a communication request receiving section configured to receive the first communication request or the second communication request from the communication request transmitting section,
a third buffer that stores the first communication request,
a fourth buffer that stores the second communication request, and
a vehicle communication section configured to communicate with the plurality of electronic control units,
in the first mode, the vehicle communication section transmits the first communication request stored in the third buffer to the electronic control unit to be inspected and receives a first response to the first communication request from the electronic control unit to be inspected, and
in the second mode, the vehicle communication section transmits the second communication request stored in the fourth buffer to the electronic control unit on which writing is to be performed and receives a second response to the second communication request from the electronic control unit on which writing is to be performed.

4. The vehicle inspection device according to claim 3, wherein
the vehicle includes a plurality of communication lines,
to each of the plurality of communication lines, one or more electronic control units are connected,
each of the third buffer and the fourth buffer includes a memory area provided for each of the plurality of communication lines,
the inspection control section is configured to perform switching between the first mode and the second mode for each of the plurality of communication lines,
in the first mode, the communication request receiving section stores the first communication request in a memory area of the third buffer, which corresponds to a first communication line, of the plurality of communication lines to which the electronic control unit to be inspected is connected, and, in the second mode, the communication request receiving section stores the second communication request in a memory area of the fourth buffer, which corresponds to a second communication line, of the plurality of communication lines, to which the electronic control unit on which writing is to be performed is connected,
the vehicle communication section is connected to the plurality of electronic control units via the plurality of communication lines, and
for each of the plurality of communication lines, in the first mode, the vehicle communication section transmits the first communication request stored in the third buffer to the electronic control unit to be inspected and receives the first response from the electronic control unit to be inspected, and, in the second mode, the vehicle communication section transmits the second communication request stored in the fourth buffer to the electronic control unit on which writing is to be performed and receives the second response from the electronic control unit on which writing is to be performed.

5. The vehicle inspection device according to claim 3, wherein each of the first to fourth buffers is a first-in-first-out buffer from which the first communication request or the second communication request is output in an order in which the first communication request or the second communication request was written.

6. The vehicle inspection device according to claim 1, wherein
the first communication request includes a first address that identifies the electronic control unit to be inspected and a first command issued to the electronic control unit to be inspected,
the second communication request includes a second address that identifies the electronic control unit on which writing is to be performed and a second command issued to the electronic control unit on which writing is to be performed,
each of the first buffer and the second buffer includes a memory area provided for each of the plurality of electronic control units, and
in the first mode, the transmission flow control section stores the first communication request in a memory area of the first buffer, which corresponds to the first address, and, in the second mode, the transmission flow control section stores the second communication request in a memory area of the second buffer, which corresponds to the second address.

7. The vehicle inspection device according to claim 1, wherein
at least one of the inspection processing section and the communication processing section includes a fifth buffer that stores a first response to the first communication request from the electronic control unit to be inspected and a second response to the second communication request from the electronic control unit on which writing is to be performed, and
in the first mode, in response to receipt, by the communication processing section, of the first response from the electronic control unit to be inspected and storage of the first response in the fifth buffer, the inspection control section determines pass or fail of the inspection item based on the first response, and, in the second mode, the inspection control section reads the second response stored in the fifth buffer at irregular intervals and checks the second response.

8. The vehicle inspection device according to claim 1, wherein
the communication processing section is configured to perform any one of reception of a first response to the first communication request from the electronic control unit to be inspected and reception of a second response to the second communication request from the electronic control unit on which writing is to be performed or both,
the first response has a data size larger than a data size of the first communication request, and
the second response has a data size smaller than a data size of the second communication request.

9. A vehicle inspection method by which an inspection processing section executes an arbitrary inspection program among inspection programs set for an inspection item about a vehicle, and generates a communication request to a plurality of electronic control units inside the vehicle, the inspection processing section transmits, from a communication processing section, the communication request to an electronic control unit to be inspected among a plurality of control units, the communication processing section receives a response to the communication request from the electronic control unit to be inspected, and the inspection processing section determines pass or fail of the inspection item based on the received response, the vehicle inspection method comprising:

- a first step of, by an inspection control section of the inspection processing section, generating a first communication request to the electronic control unit to be inspected based on the inspection program or generating a second communication request which has a data size larger than a data size of the first communication request and gives an instruction to perform writing of a control program to an arbitrary electronic control unit of the plurality of electronic control units;
- a second step of recognizing a first mode in which an inspection is performed on the electronic control unit to be inspected or a second mode in which writing of the control program is performed on the electronic control unit on which writing is to be performed, and of switching between the first mode and the second mode based on a result of the recognition,
- a third step of storing, in the first mode, the first communication request in a first buffer of the inspection processing section or storing, in the second mode, the second communication request in a second buffer of the inspection processing section; and
- a fourth step of performing any one of transmission of the first communication request stored in the first buffer from the communication processing section to the electronic control unit to be inspected and transmission of the second communication request stored in the second buffer from the communication processing section to an electronic control unit on which writing is to be performed or both.

* * * * *